United States Patent
Yamaguchi et al.

(10) Patent No.: US 7,907,979 B2
(45) Date of Patent: Mar. 15, 2011

(54) ELECTRONIC APPARATUS, DISPLAY CONTROL METHOD AND RECORDING MEDIUM

(75) Inventors: Shigeru Yamaguchi, Kawasaki (JP);
Shigeo Nonoyama, Kawasaki (JP);
Hiroshi Kobayashi, Kawasaki (JP);
Tomoyuki Nagamine, Kawasaki (JP);
Tetsuya Hori, Kawasaki (JP); Yoshiaki Katou, Kawasaki (JP); Koji Nakakubo, Kawasaki (JP); Takashi Kojima, Kawasaki (JP); Toshiyuki Itoh, Kawasaki (JP); Manabu Sotodate, Kawasaki (JP); Yoshitomo Ishii, Kawasaki (JP); Susumu Nikawa, Kawasaki (JP); Kenetsu Furuki, Kawasaki (JP); Hironobu Taniguchi, Kawasaki (JP); Yoshihiro Ono, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 589 days.

(21) Appl. No.: 11/859,400

(22) Filed: Sep. 21, 2007

(65) Prior Publication Data

US 2008/0076492 A1 Mar. 27, 2008

(30) Foreign Application Priority Data

Sep. 22, 2006 (JP) .................................. 2006-257321

(51) Int. Cl.
*H04B 1/38* (2006.01)
(52) U.S. Cl. ............... 455/575.1; 455/575.3; 455/575.4; 455/566
(58) Field of Classification Search ............... 455/575.1, 455/575.3, 575.4, 566
See application file for complete search history.

(56) References Cited

U.S. PATENT DOCUMENTS

| | | | |
|---|---|---|---|
| 5,881,299 A | 3/1999 | Nomura | |
| 6,549,789 B1 * | 4/2003 | Kfoury | ................ 455/550.1 |
| 7,174,195 B2 * | 2/2007 | Nagamine | ................ 455/575.1 |
| 7,200,423 B2 | 4/2007 | Bum | |
| 7,502,636 B2 | 3/2009 | Sakuta et al. | |
| 2003/0013417 A1 | 1/2003 | Bum | |
| 2004/0198460 A1 | 10/2004 | Sakuta et al. | |
| 2007/0249407 A1 | 10/2007 | Bum | |

FOREIGN PATENT DOCUMENTS

| | | |
|---|---|---|
| CN | 1404281 A | 3/2003 |
| CN | 1571430 A | 1/2005 |
| CN | 1829239 A | 9/2006 |
| JP | 09-146499 A | 6/1997 |
| JP | 11-143386 A | 5/1999 |
| JP | 2003-319043 A | 11/2003 |

(Continued)

OTHER PUBLICATIONS

Korean Office Action dated Jun. 30, 2008, issued in corresponding Korean Patent Application No. 10-2007-009663.
Korean Office Action dated Sep. 1, 2009, issued in corresponding Korean Patent Application No. 10-2009-46761.

(Continued)

Primary Examiner — Tuan A Pham
(74) Attorney, Agent, or Firm — Fujitsu Patent Center

(57) ABSTRACT

An electronic apparatus has a fixed case unit and a movable case unit, and the rotation operability of the movable case unit is improved. The electronic apparatus having the fixed case unit and movable case unit also includes a movable arm, which is fitted openably and closably to the fixed case unit via a hinge. The movable case unit is supported rotatably on the movable arm, and the rotation center of the movable case unit is set at a position near the hinge to be on or near the centerline of the movable case unit.

12 Claims, 28 Drawing Sheets

FOREIGN PATENT DOCUMENTS

| | | |
|---|---|---|
| JP | 2004-056609 A | 2/2004 |
| JP | 2005-333219 A | 12/2005 |
| JP | 2006-180071 A | 7/2006 |
| KR | 2003-0000166 A | 1/2003 |
| KR | 10-2006-20352 | 3/2006 |
| KR | 10-2006-0098028 | 9/2006 |
| WO | WO-2006/096004 | 9/2006 |

OTHER PUBLICATIONS

Chinese Office Action dated Jan. 22, 2010 (Issuing Date), issued in corresponding Chinese Patent Application No. 200710152795.8.

"Korean Office Action", mailed Mar. 24, 2010 from KR Patent Office for corresponding KR Patent App. No. 10-2009-46761, with Whole English translation.

Japan Patent Office: "Japanese Office Action", mailed Oct. 26, 2010 from the Japanese Patent Office for corresponding JP Patent App. No. 2006-257321, with partial English-language translation attached.

Korean Intellectual Property Office: "Korean Office Action", mailed Nov. 26, 2010 from the Korean Intellectual Property Office for corresponding KR Patent Appl. No. 10-2007-96633, with partial English-language translation attached.

* cited by examiner

ELECTRONIC APPARATUS, DISPLAY CONTROL METHOD AND RECORDING MEDIUM

CROSS-REFERENCE TO RELATED APPLICATIONS

This application is based upon and claims the benefit of priority from the prior Japanese Patent Application No. 2006-257321, filed on Sep. 22, 2006, the entire contents of which are incorporated herein by reference.

BACKGROUND OF THE INVENTION

1. Field of the Invention

The present invention relates generally to an electronic apparatus, such as a foldable portable terminal apparatus, and more particularly, to an electronic apparatus having a display side case unit with a rotation function, a display control method for the electronic apparatus, a display control program for the electronic apparatus, and a recording medium.

2. Description of the Related Art

An electronic apparatus, such as a portable terminal apparatus, can be folded into a compact form when carried around if a case unit at the operation unit side and a case unit at the display unit side of the apparatus are openable and closable via a hinge. Besides, the electronic apparatus can be used with its display unit set in a vertically elongated form or a horizontally elongated form if the case unit having the display unit of a vertically elongated form is rotatable.

Japanese Patent Application Laid-Open Publication No. 2003-319043 discloses an apparatus related to such a portable terminal apparatus as described above, which has a folding function and the display side case unit with a rotation function. The disclosed apparatus includes an upper unit and a lower unit that are coupled to be openable and closable via a hinge, and the upper unit has a support unit and a display unit arranged in such a way that the display unit is rotatable and slidable relative to the support unit through a rotation/slide mechanism (ABSTRACT, claim 3, FIG. 4, etc.).

According to the conventional structure (Japanese Patent Application Laid-Open Publication No. 2003-319043) allowing the display unit of the display side case unit to be manipulated from a state of vertical elongation into a state of horizontal elongation or from the state of horizontal elongation into the state of vertical elongation, the display side case unit is shaped into an oblong corresponding to the shape of the display unit. Because of this, when the display unit is kept in the state of vertical elongation in normal time, rotating the display side case unit from the state of vertical elongation into the state of horizontal elongation creates an unnecessary gap between the horizontally elongated display unit and the operation unit. When the display unit is kept in the state of horizontal elongation in normal time, on the other hand, the rotation of the display side case unit becomes difficult. Solving this problem requires simultaneous use of a rotation function and a slide function in such a way that the unnecessary gap resulting from the rotation from the state of vertical elongation into the state of horizontal elongation is eliminated by moving the display side case unit toward the operation side case unit to bring both units closer to each other, using the slide function. This needs a complicated mechanism and operation therefore. Providing such a mechanism leads to poor operability, complicated rotation and slide mechanisms, and disadvantageous manufacturing costs.

With respect to the above requirement and problem, Japanese Patent Application Laid-Open Publication No. 2003-319043 offers no disclosure and suggestion including a structure that is a solution to the requirement and problem.

SUMMARY OF THE INVENTION

An object of the present invention is therefore to improve the rotation operability of a movable case unit of an electronic apparatus having a fixed case unit and the movable case unit.

Another object of the present invention is to improve the visibility of a display unit of an electronic apparatus having a fixed case unit and a movable case unit.

Specifically, the visibility of the display unit is improved by displacing the display unit disposed on the movable case unit with regard to the centerline of the fixed case unit.

Still another object of the present invention is to simplify an electronic apparatus having a fixed case unit and a movable case unit and/or to reduce the electronic apparatus into a compact one.

Still another object of the present invention is to improve the operability of an operation unit of an electronic apparatus having a fixed case unit and a movable case unit.

To achieve the above objects, the present invention provides an electronic apparatus having a fixed case unit and a movable case unit, which electronic apparatus is provided with a movable arm that is fitted openably/closably to the fixed case unit via a hinge. In the electronic apparatus, the movable case unit is supported rotatably on the movable arm. This allows the fixed case unit and movable case unit to be brought into an opened state or into a closed state, that is, to be folded and unfolded as the movable arm is opened or closed against the fixed case unit. As a result, the electronic apparatus can be simplified and/or reduced into a compact one. The rotation center of the movable case unit is set at a position near the hinge, which causes the movable case unit to rotate near the hinge, that is, near the fixed case unit. This structure does not require a separate slide function in addition to a rotation function, thus simplifying a rotation structure to improve the rotation operability of the movable case unit and also improve the visibility of a display unit when the display unit is disposed on the movable case unit. Hence the above objects are achieved.

In order to achieve the above objects, according to a first aspect of the present invention there is provided an electronic apparatus having a fixed case unit and a movable case unit, comprising a movable arm fitted openably and closably to the fixed case unit via a hinge, wherein the movable case unit is supported rotatably on the movable arm, with a rotation center of the movable case unit being positioned near the hinge.

The movable case unit may have an edge that rotates close to the hinge.

The rotation center of the movable case unit may be positioned on or near a centerline of the movable case unit.

The movable case unit may be capable of rotating in both directions to the left and right of the centerline of the movable case unit.

A distance between the rotation center of the movable case unit and a rotation center of the hinge may be smaller than a width of the movable case unit and be larger than a half of the width.

The movable case unit may have a display unit on a face facing the fixed case unit.

In case where the movable case unit is rotated while the movable arm and the fixed case unit are closed together, the movable case unit may shift relative to the fixed case unit to allow visual recognition of a part or the whole of a display area of a display unit on the movable case unit.

The fixed case unit may have an input operation unit on a face facing the movable case unit.

The electronic apparatus may comprise a display unit disposed on the movable case unit; a rotation sensor detecting a rotation angle of the movable case unit; and a controlling unit changing a display form of a display screen on the display unit, the display form being changed on the basis of an angle detected by the rotation sensor.

The electronic apparatus may comprise an opening/closing sensor detecting opening and closing of the movable arm, wherein the controlling unit causes the display unit to display a display screen on the basis of rotation detected by the rotation sensor in case where the movable case unit is closed, the display screen being displayed in a display form different from a display form that is displayed in case where the movable case unit is opened.

The rotation sensor may include a rotation sensor detecting leftward rotation of the movable case unit; and a rotation sensor detecting rightward rotation of the movable case unit.

To achieve the above object, according to a second aspect of the present invention there is provided a display control method for an electronic apparatus having a fixed case unit and a movable case unit, comprising the steps of detecting a rotation angle of the movable case unit supported rotatably on a movable arm and having a display unit, the movable arm being fitted openably and closably to the fixed case unit via a hinge; and causing the display unit to take a different display form on the basis of the detection of rotation.

The display control method for the electronic apparatus may comprise the steps of detecting opening and closing of the movable arm supporting the movable case unit; and causing the display unit to display a display screen on the basis of the detection of rotation in case where the movable case unit is closed on the fixed case unit, the display screen being displayed in a display form different from a display form that is displayed in case where the movable case unit is opened.

To achieve the above object, according to a third aspect of the present invention there is provided a computer-readable display control program for an electronic apparatus having a fixed case unit and a movable case unit, the program being operable to drive a computer to execute the steps of taking in rotation angle information on the movable case unit supported rotatably on a movable arm and having a display unit, the movable arm being fitted openably and closably to the fixed case unit via a hinge; and causing the display unit to take a different display form on the basis of the rotation angle information.

The display control program may further comprise the steps of taking in detection information on opening and closing of the movable arm supporting the movable case unit; and causing the display unit to display a display screen on the basis of the detection of rotation in case where the movable case unit is closed on the fixed case unit, the display screen being displayed in a display form different from a display form that is displayed in case where the movable case unit is opened.

To achieve the above object, according to a fourth aspect of the present invention there is provided a recording medium having stored thereon a computer-readable display control program for an electronic apparatus having a fixed case unit and a movable case unit, the program being operable to drive a computer to execute the steps of taking in rotation angle information on the movable case unit supported rotatably on a movable arm and having a display unit, the movable arm being fitted openably and closably to the fixed case unit via a hinge; and causing the display unit to take a different display form on the basis of the rotation angle information.

The program may further comprise the steps of taking in detection information on opening and closing of the movable arm supporting the movable case unit; and causing the display unit to display a display screen on the basis of the detection of rotation in case where the movable case unit is closed on the fixed case unit, the display screen being displayed in a display form different from a display form that is displayed in case where the movable case unit is opened.

The features and advantages of the present invention are enumerated as follows.

(1) When the electronic apparatus is in the closed state, the movable case unit and the movable arm are folded onto the fixed case unit, in which state the movable case unit can be rotated. When the electronic apparatus is in the opened state, the movable case unit is superposed on the movable arm, in which state the movable case unit can be rotated. Because of this, when the movable case unit is provided with, for example, the display unit, the movable case unit can be displaced to exert a display function not only in the opened state but also in the closed state. This allows simplification and size reduction, thus improving the functional performance of the electronic apparatus, such as a portable terminal apparatus.

(2) Since the rotation center of the movable case unit is located near the hinge of the fixed case unit, the movable case unit can be brought closer to the fixed case unit according to the angle of rotation of the movable case unit. Because of this, providing the fixed case unit with an input operation unit and the movable case unit with the display unit can improve the visibility of the display unit and the operability of the input operation unit.

(3) Making the movable case unit rotatable both to the left and right can improve the display function of the electronic apparatus to offer such an advantage as a display form that can be changed according to rotational displacement.

(4) Since the movable case unit is supported rotatably on the movable arm that is fitted to the fixed case unit via the hinge, the movable case unit can be rotated independent of the opened or closed state of the movable arm. This can improve the rotation operability of the movable case unit.

Other objects, features, and advantages of the present invention will be clearly understood by referring to the accompanying drawings and embodiments.

DETAILED DESCRIPTION OF THE PREFERRED EMBODIMENTS

First Embodiment

Figure 1:
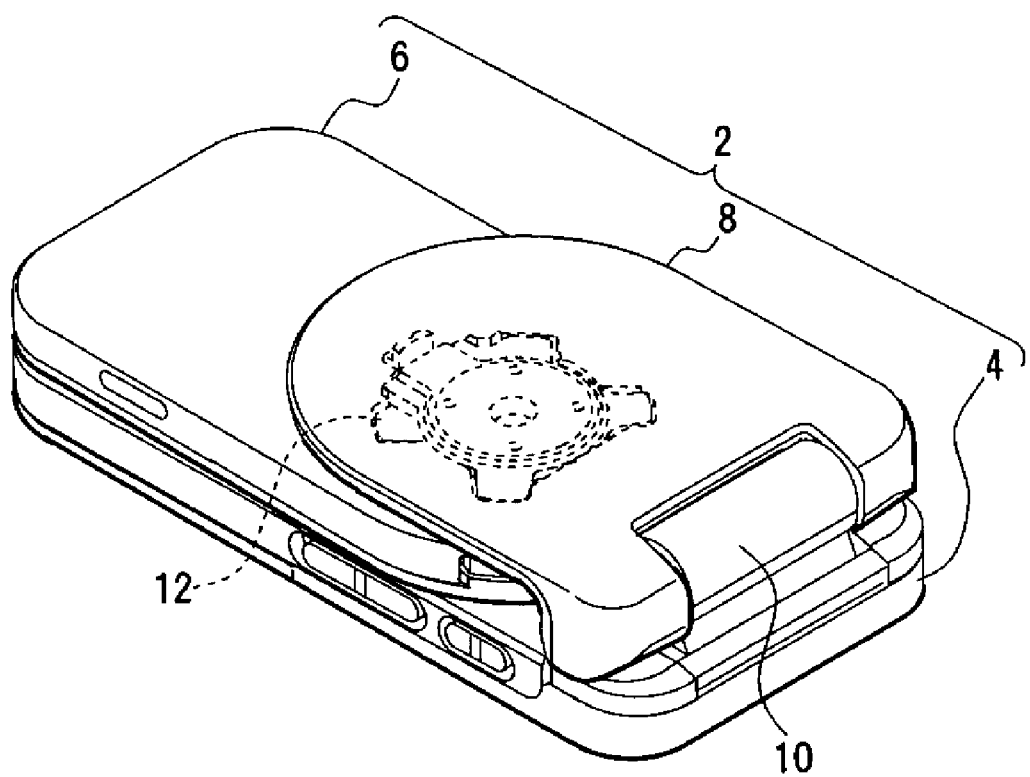
FIG. 1 is a perspective view of a portable terminal apparatus according to a first embodiment.
Figure 2:
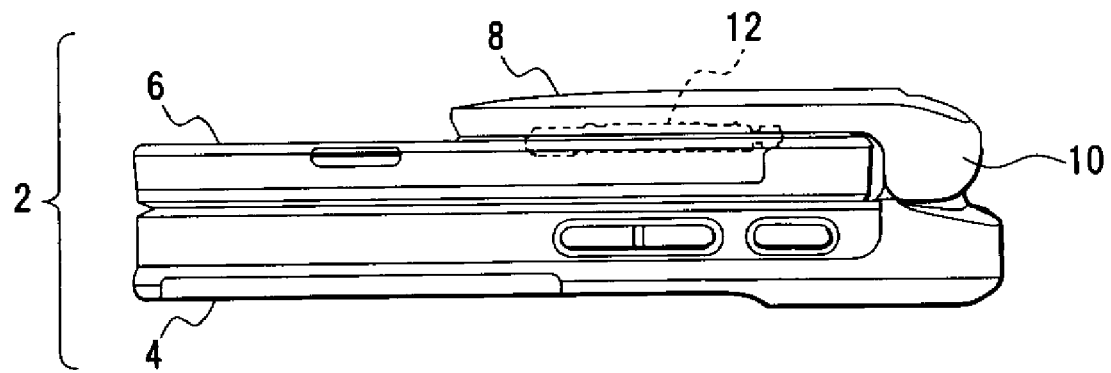
FIG. 2 is a side view of a closed state of the portable terminal apparatus.
Figure 5:
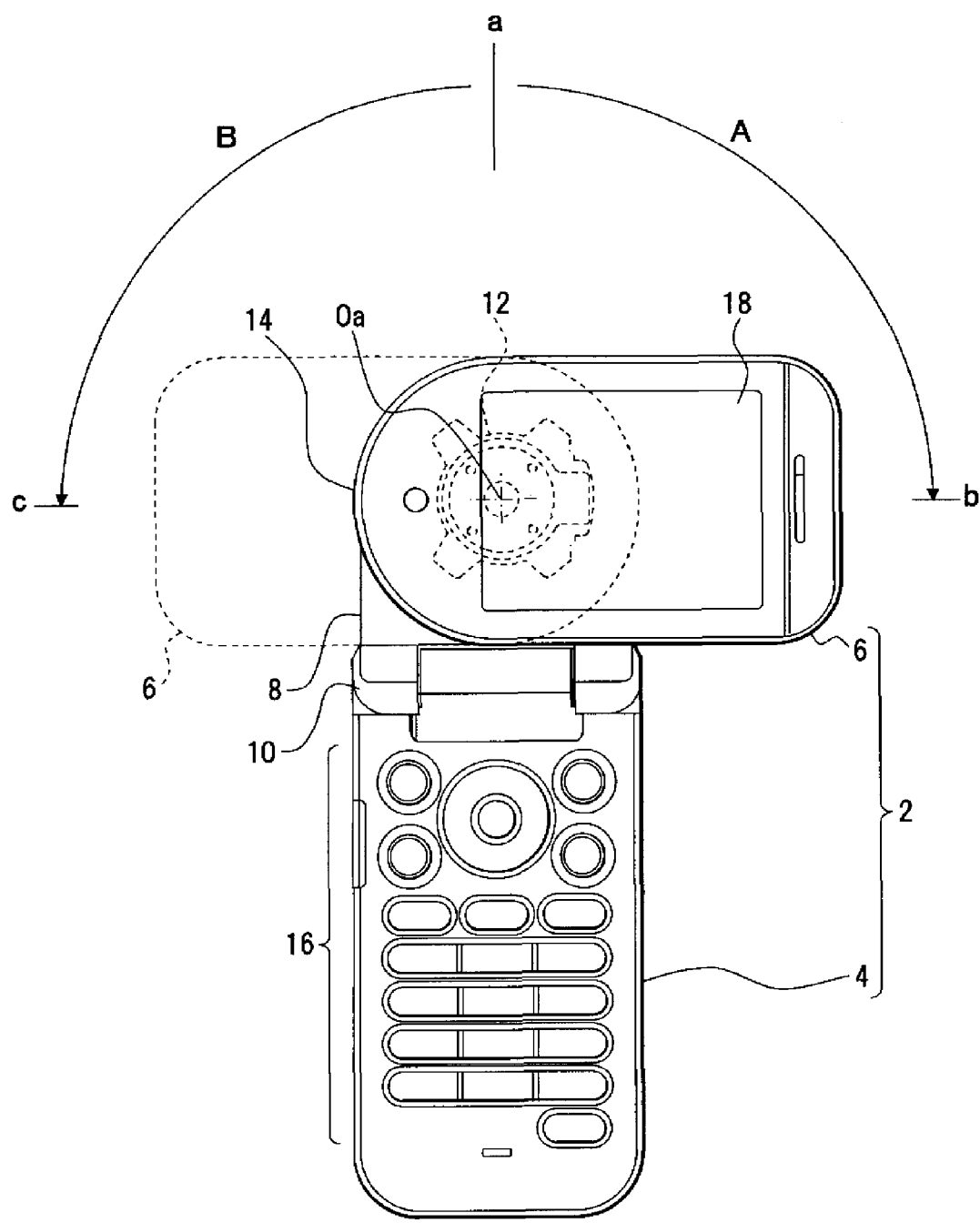
FIG. 5 depicts the rightward rotation (leftward rotation) of a movable case unit of the portable terminal apparatus in the opened state.
Figure 6:
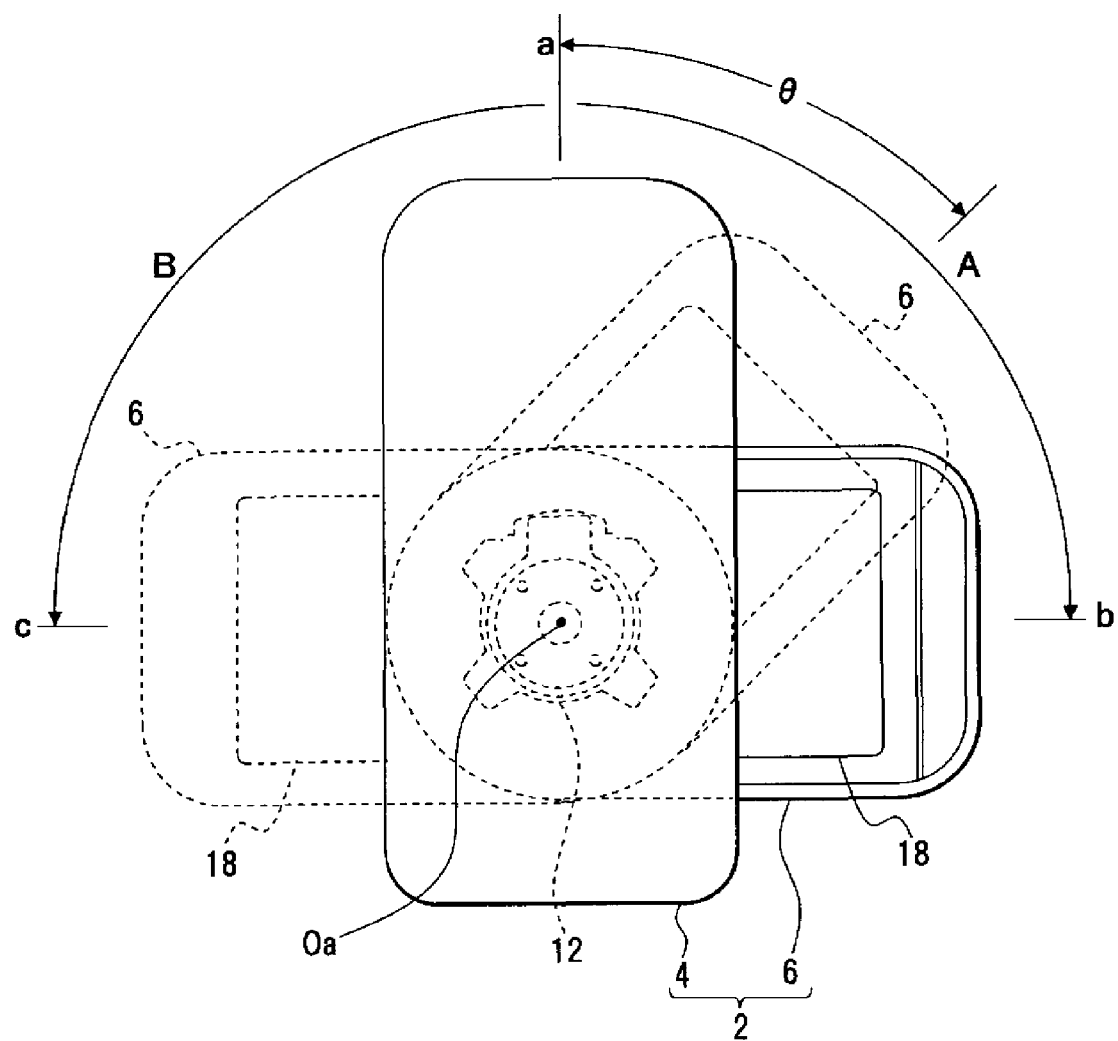
FIG. 6 depicts the rightward rotation (leftward rotation) of the movable case unit of the portable terminal apparatus in the closed state.

A first embodiment of the present invention will now be described with reference to FIGS. 1 to 6. FIG. 1 is a perspective view of a portable terminal apparatus, FIG. 2 is a side view of a closed state of the portable terminal apparatus, FIG. 3 is front view of an opened state of the portable terminal apparatus, FIG. 4 depicts the size relation of the portable terminal apparatus in the opened state, FIG. 5 depicts the rightward rotation (leftward rotation) of a movable case unit of the portable terminal apparatus in the opened state, and FIG. 6 depicts the rightward rotation (leftward rotation) of the movable case unit of the portable terminal apparatus in the closed state.

The portable terminal apparatus 2 is an example of an electronic apparatus having a plurality of movable units, such as an opening/closing unit and a rotary unit. As shown in FIGS. 1 and 2, the portable terminal apparatus 2 includes a fixed case unit 4 serving as an operation side case unit, and a movable case unit 6 serving as a display side case unit. A movable arm 8 is fitted to the fixed case unit 4 via a hinge 10 serving as an opening/closing unit, and a rotary module 12 serving as a rotary supporting unit is fitted to the movable arm 8. The movable case unit 6 is fixed to the rotary module 12, which allows the movable case unit 6 to rotate from a central position to the left and right at an angle of, for example, 90 degrees. In other words, the fixed case unit 4 has the openable/closable movable arm 8 fitted thereto via the hinge 10, on which movable arm 8 the movable case unit 6 is supported rotatably.

Figure 3:
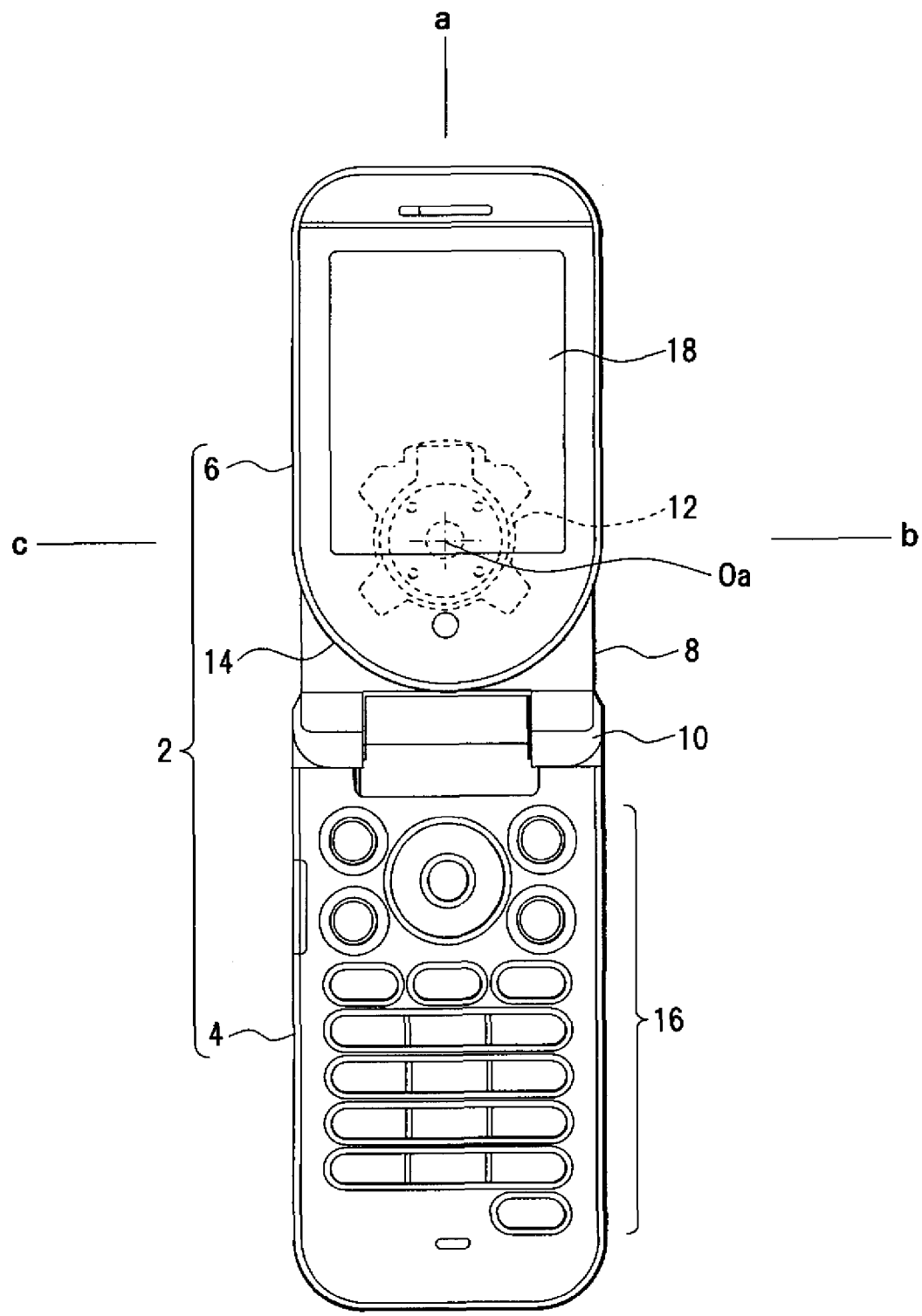
FIG. 3 is front view of an opened state of the portable terminal apparatus.

As shown in FIG. 3, the rotation center Oa of the movable case unit 6 is set at a position near the hinge 10, and a periphery 14 made into a semicircular edge is formed on the movable case unit 6. The fixed case unit 4 is provided with an input operation unit 16 having a plurality of keys including character keys and a cursor key, and the movable case unit 6 is provided with a display unit 18 composed of an LCD (Liquid Crystal Display) element, etc.

Figure 4:
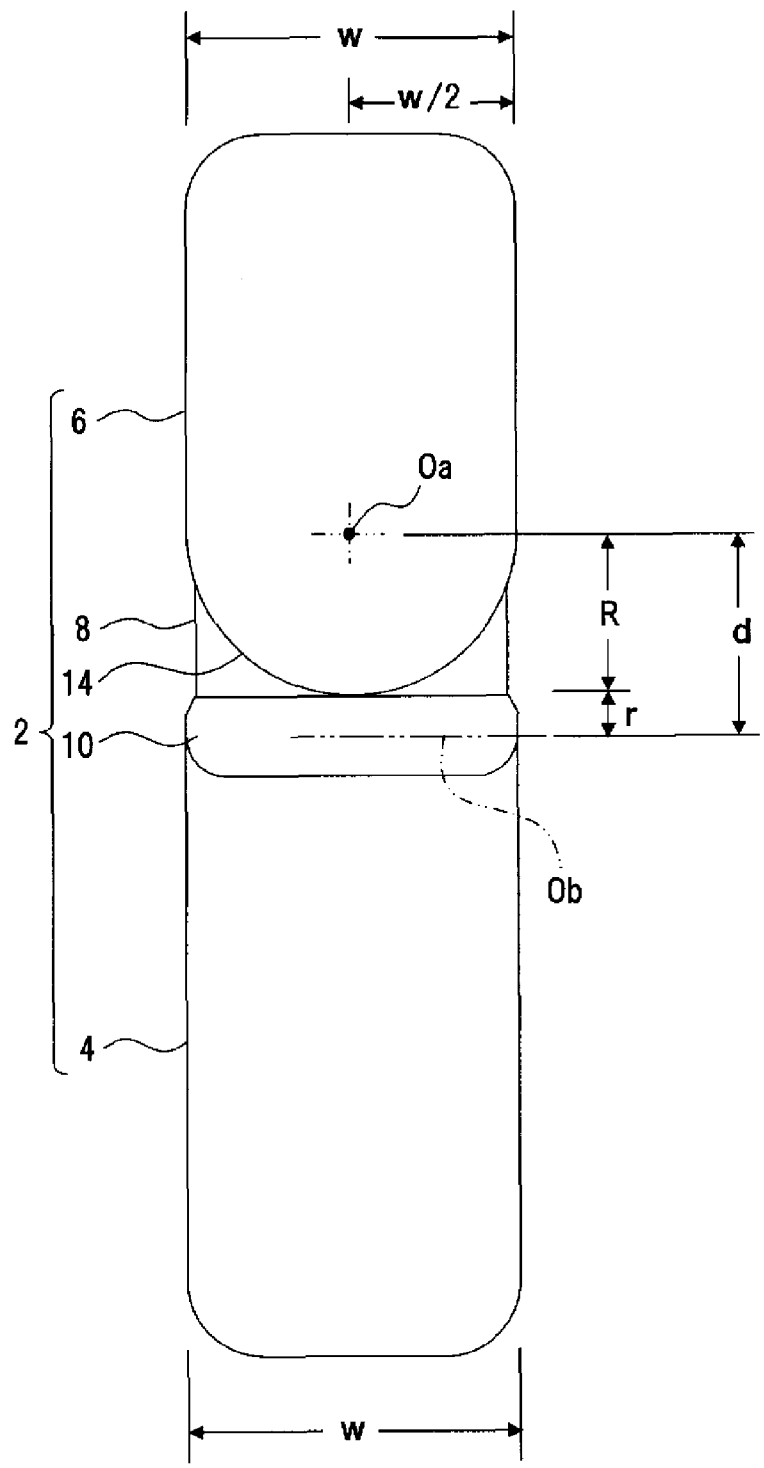
FIG. 4 depicts the size of each portion of the portable terminal apparatus.

When the rotation radius of the periphery 14 of the movable case unit 6 is R, an overhang width from the rotation center Ob of the hinge 10 is r, the distance between the rotation center Oa and the rotation center Ob is d, the width of the fixed case unit 4 and of the movable case unit 6 is w, and a half of the width w is w/2, as shown in FIG. 4, the following relational expressions are satisfied.

$$R < d - r \quad (1)$$

$$w/2 = R \quad (2)$$

$$(d - r) - R \approx 0 \quad (3)$$

The expression (1) expresses the fact that the periphery 14 of the movable case unit 6 can be rotated without coming in contact with the outer face of the hinge 10. Satisfactions of the expression (2) means that the periphery 14 is the semicircle of the circle having the radius equal to half of the width of the movable case unit 6.

Setting $(d-r)$ equal to R, as expressed in the expression (3), means location of the periphery 14 of the movable case unit 6 close to the outer surface of the hinge 10, thus meaning that the side edge of the movable case unit 6 is brought closer to the hinge 10 when the movable case unit 6 is rotated at 90 degrees.

The above portable terminal apparatus 2 having the hinge 10 and the rotary module 12 as movable units is capable of causing the movable case unit 6 to open and close with the movable arm 8 or to rotate at a given angle. The movable case unit 6 closes with the movable arm 8 onto the fixed case unit 4, as shown in FIGS. 1 and 2, or can be kept in the opened state, as shown in FIG. 3. In addition, the movable arm 8 and the movable case unit 6 can be stopped and held still in the course of transition from the closed state to the opened state. In the opened state shown in FIG. 3, a represents the central position (leftward/rightward rotation starting point) coinciding with the centerline of the movable case unit 6, b represents the rightward rotation position (rotation end at the right) of the movable case unit 6, and c represents the leftward rotation position (rotation end at the left) of the movable case unit 6, where the positions a, b, and c are determined relative to the display unit 18.

In the opened state, as shown in FIG. 5, the movable case unit 6 is rotated in a direction of an arrow A (rightward) from the central position a to the rightward rotation position b and is fixed there, or is rotated in a direction of an arrow B (leftward) from the central position a or from the rightward rotation position b to the leftward rotation position c and is fixed there, where the movable case unit 6 can be so positioned relative to the fixed case unit 4 as to form an L shape. The movable case unit 6 can be stopped by a stopping torque of the rotary module 12 and held still at a stopping position on the way to the rotation ends b and c at the left and right.

Also in the closed state, as shown in FIG. 6, the movable case unit 6 is rotated in a direction of an arrow A (rightward) from the central position a to the rightward rotation position b and is fixed there, or is rotated in a direction of an arrow B (leftward) from the central position a to the leftward rotation position c and is fixed there, where the movable case unit 6 can be so positioned relative to the fixed case unit 4 as to form an L shape. The movable case unit 6 can be stopped by the stopping torque of the rotary module 12 and held still at a stopping position on the way to the rotation ends b and c at the left and right.

Through such a rotating operation, a display function of the display unit 18 is started up at a point where the rotation angle θ of the movable case unit 6 becomes, for example, 20 degrees. This allows a user to visually recognize a part of the display contents of the display 18 on the movable case unit 6 from the back of the fixed case unit 4 even before the movable case unit 6 reaches the rightward rotation position b or the leftward rotation position c.

Figure 7:
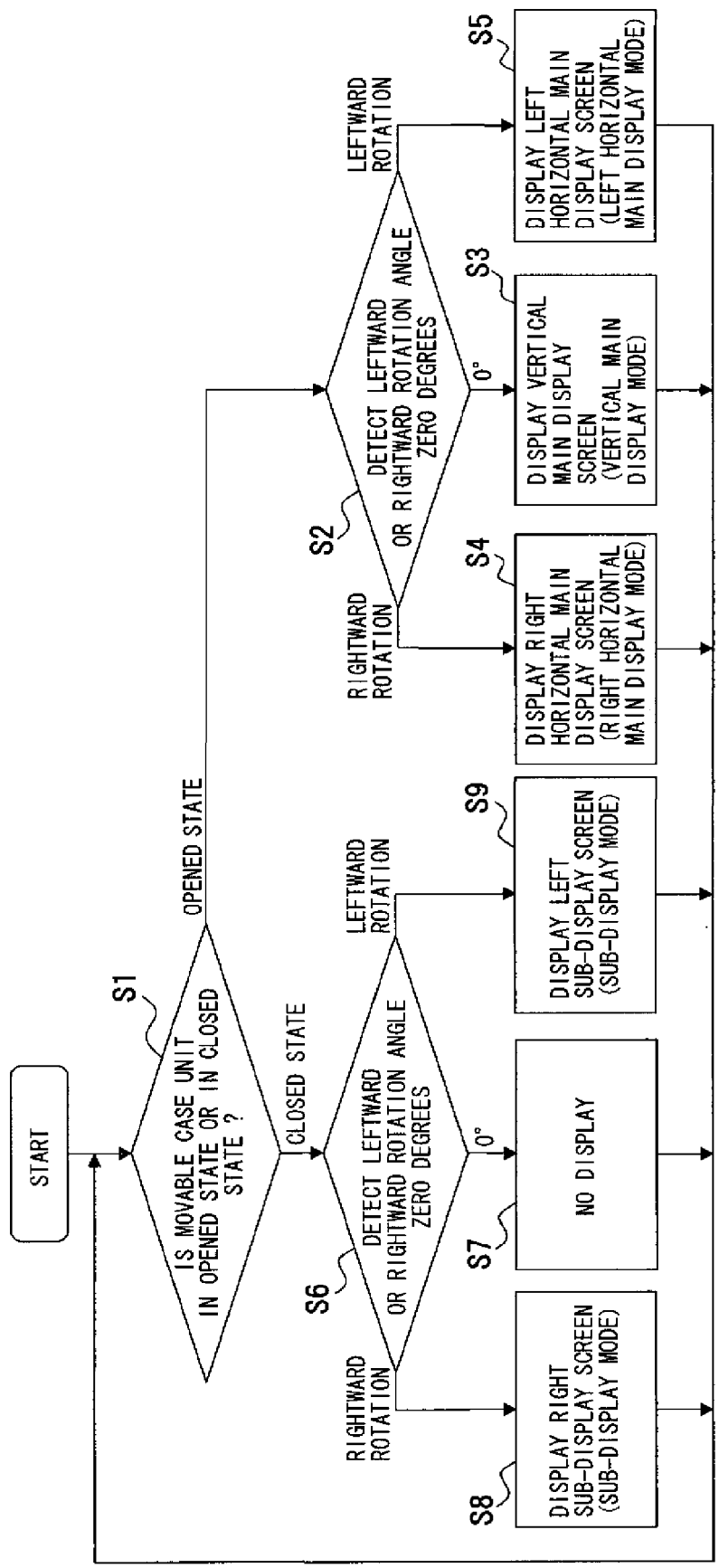
FIG. 7 is a flowchart of an example of a display control method for the portable terminal apparatus.

A display control method for the portable terminal apparatus 2 will then be described with reference to FIGS. 1 to 3 and FIGS. 5 to 7. FIG. 7 is a flowchart of a procedure representing an example of the display control method for the portable terminal apparatus 2.

According to this display control method, whether the movable case unit 6 is in the opened state or in the closed state is detected (step S1). When the movable case unit 6 is in the opened state, a leftward or rightward rotation angle is detected and a determination is made on the rotation (step S2).

In the opened state, a vertical main display screen (vertical main display mode) is displayed when the rotation angle of the movable case unit 6 is zero (step S3), a right horizontal main display screen (right horizontal main display mode) is displayed when the rotation is rightward (step S4), and a left horizontal main display screen (left horizontal main display mode) is displayed when the rotation is leftward (step S5).

Likewise, when the movable case unit 6 is in the closed state, a leftward or rightward rotation angle is detected and a determination is made on the rotation (step S6). In the closed state, no screen is displayed when the rotation angle is zero (step S7), a right sub-display screen (sub-display mode) is displayed when the rotation is rightward (step S8), and a left sub-display screen (sub-display mode) is displayed when the rotation is leftward (step S9).

The control method includes the following procedure for changing a display form in response to the opening and closing of the fixed case unit 4 and movable case unit 6, rotation of the movable case unit 6, etc.

(a) Detecting the Opening and Closing or Rotation of the Movable Case Unit 6

The movable case unit 6 is opened and closed against the fixed case unit 4 via the movable arm 8 and the hinge 10, and can be rotated on the movable arm 8 in the opened state as well as in the closed state. To change a display form according to the opened and closed state and the rotation angle of the movable case unit 6, therefore, an opening/closing sensor 112 detects the opened state or closed state of the movable case unit 6, and rotation sensors 42 and 44 detect the rotation angle θ of the movable case unit 6.

(b) Changing a Display Mode

When the movable case unit 6 is in the opened state, the display unit 18 puts out a vertical main display screen (vertical main display mode), a right horizontal main display screen (right horizontal main display mode), or a left horizontal main display screen (left horizontal main display mode) in every change in a display mode. When the movable case unit 6 is in the closed state, the display unit 18 puts out no screen, a right sub-display screen (sub-display mode), or a left sub-display screen (sub-display mode) in every change in a display mode.

(c) Display Screen Control

Display screen control is carried out by a display control program, which will be described later.

(d) Display by the Display Unit 18 of the Movable Case Unit 6 in the Opened State When the movable case unit 6 is in the opened state and the rotation angle θ is zero, the display unit 18 of the movable case unit 6 puts out a vertical main display screen. In response to the leftward and rightward rotation of the movable case unit 6, the display unit 18 puts out a left side main display screen and a right side main display screen.

(e) Display by the Display Unit 18 of the Movable Case Unit 6 in the Closed State When the movable case unit 6 is in the closed state and the rotation angle θ is zero, the display unit 18 of the movable case unit 6 is superposed on the fixed case unit 4. In this case, display by the display unit 18 is canceled.

Figure 22:
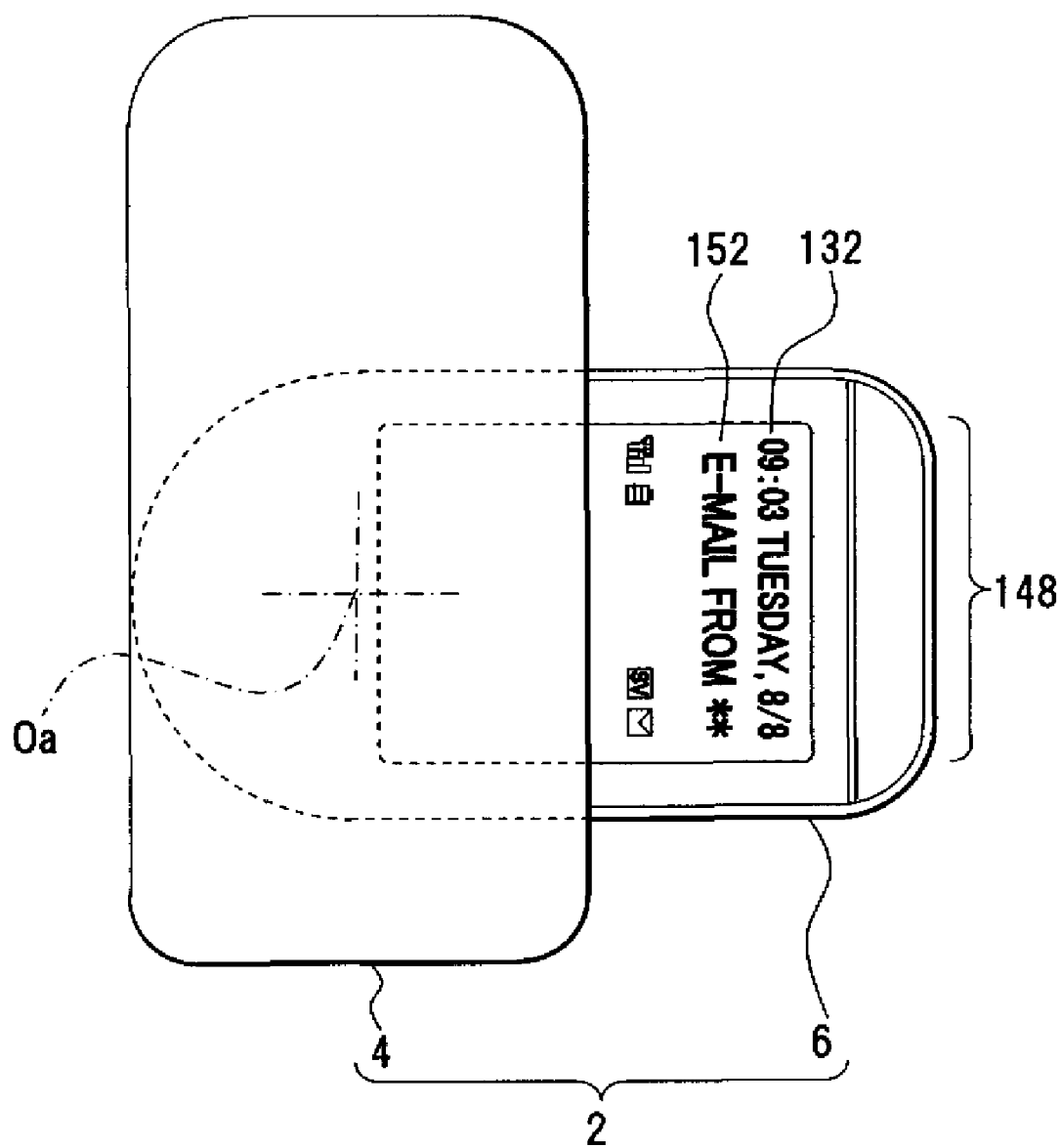
FIG. 22 depicts the right sub-display screen (reception of the incoming e-mail)
Figure 23:
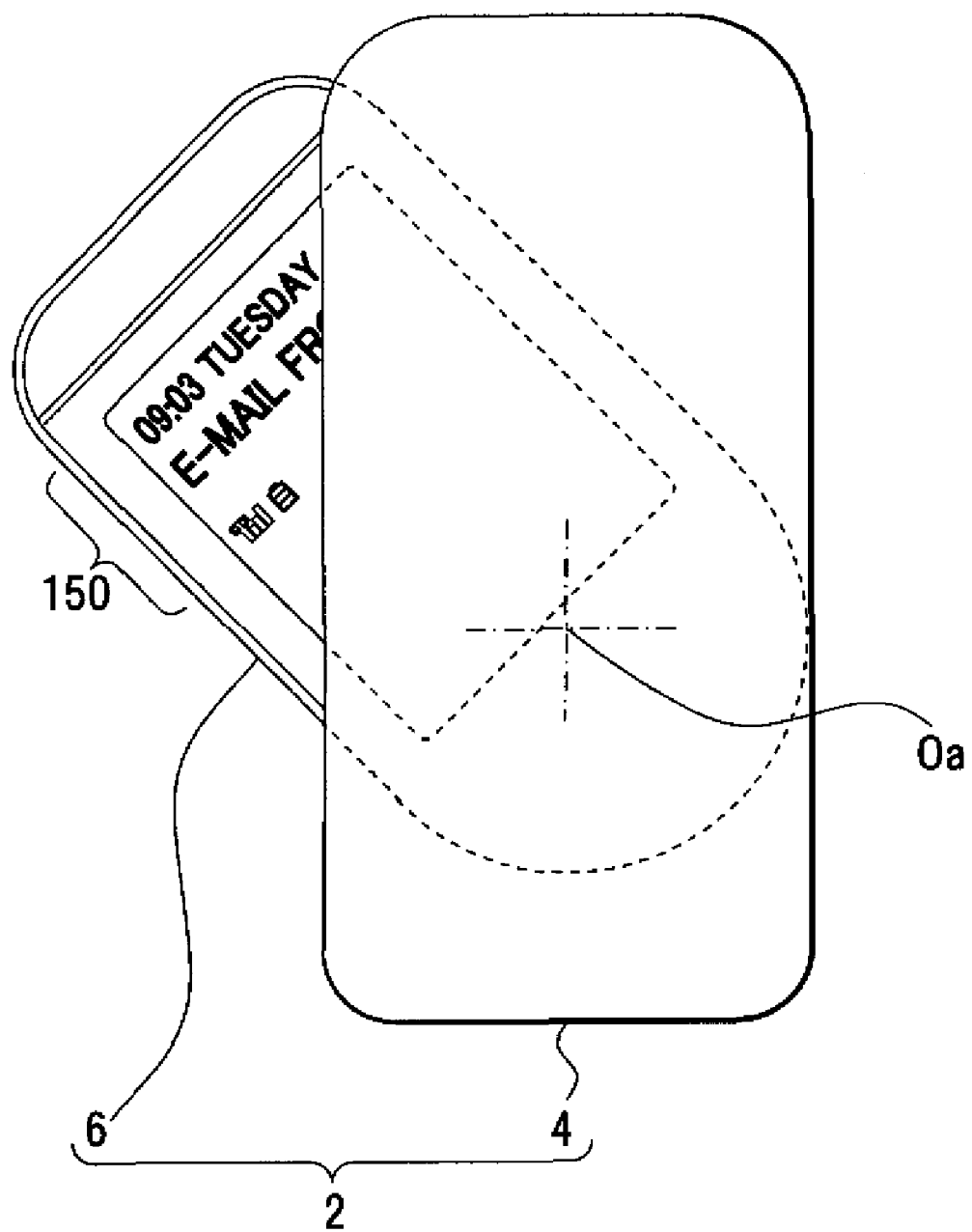
FIG. 23 depicts a left sub-display screen (reception of an incoming e-mail)
Figure 24:
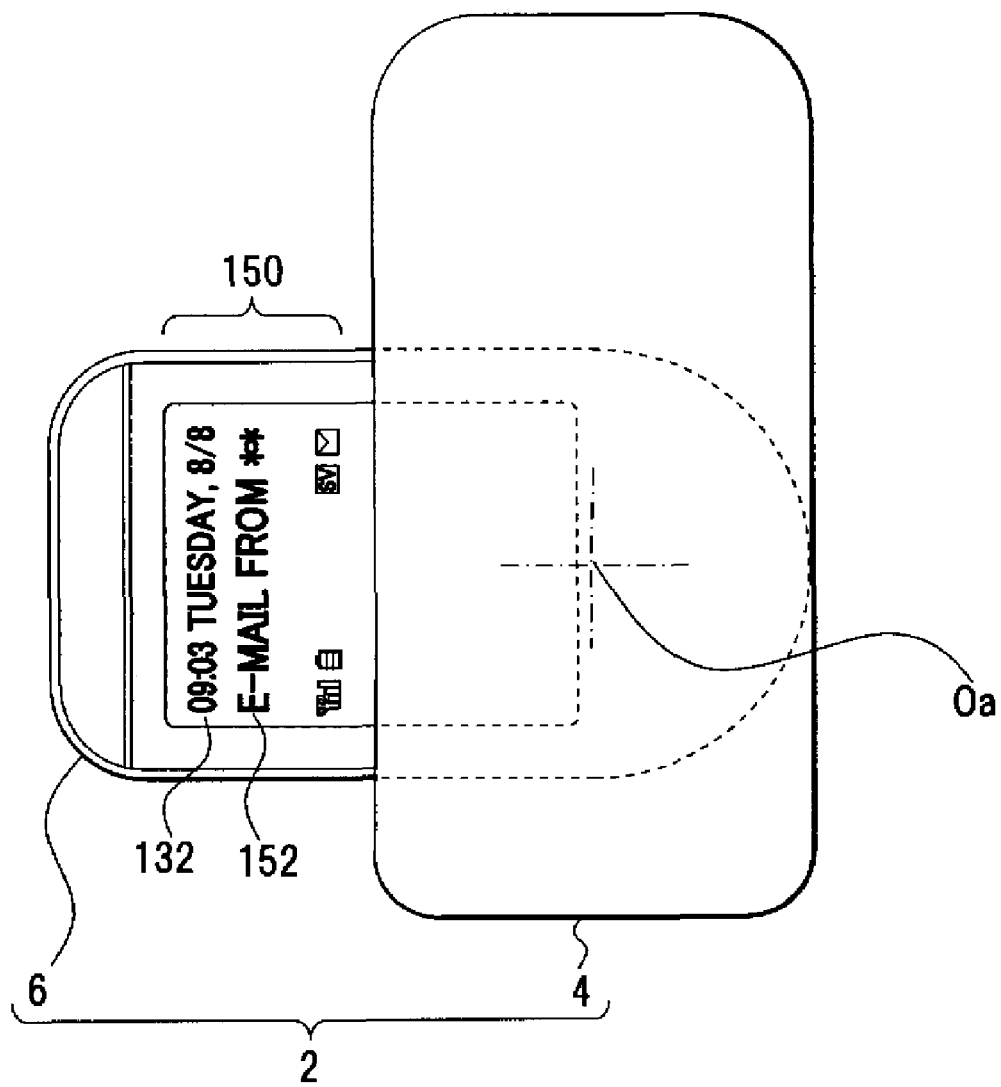
FIG. 24 depicts the left sub-display screen (reception of the incoming e-mail)

(f) The Rotation of the Movable Case Unit 6 in the Closed State at an Angle Equal to or Larger than a Given Angle According to the present embodiment, when the movable case unit 6 rotates to make the given angle or larger, for example, to reach the rotation angle θ of 20 degrees, the display unit 18 is started by detection output from the rotation sensors 42 and 44, putting out a screen displaying reception of a voice message, e-mail, etc., such as a sub-display screen 140 (FIG. 18), 142 (FIG. 19), 148 (FIGS. 21 and 22), and 150 (FIGS. 23 and 24).

Figure 8:
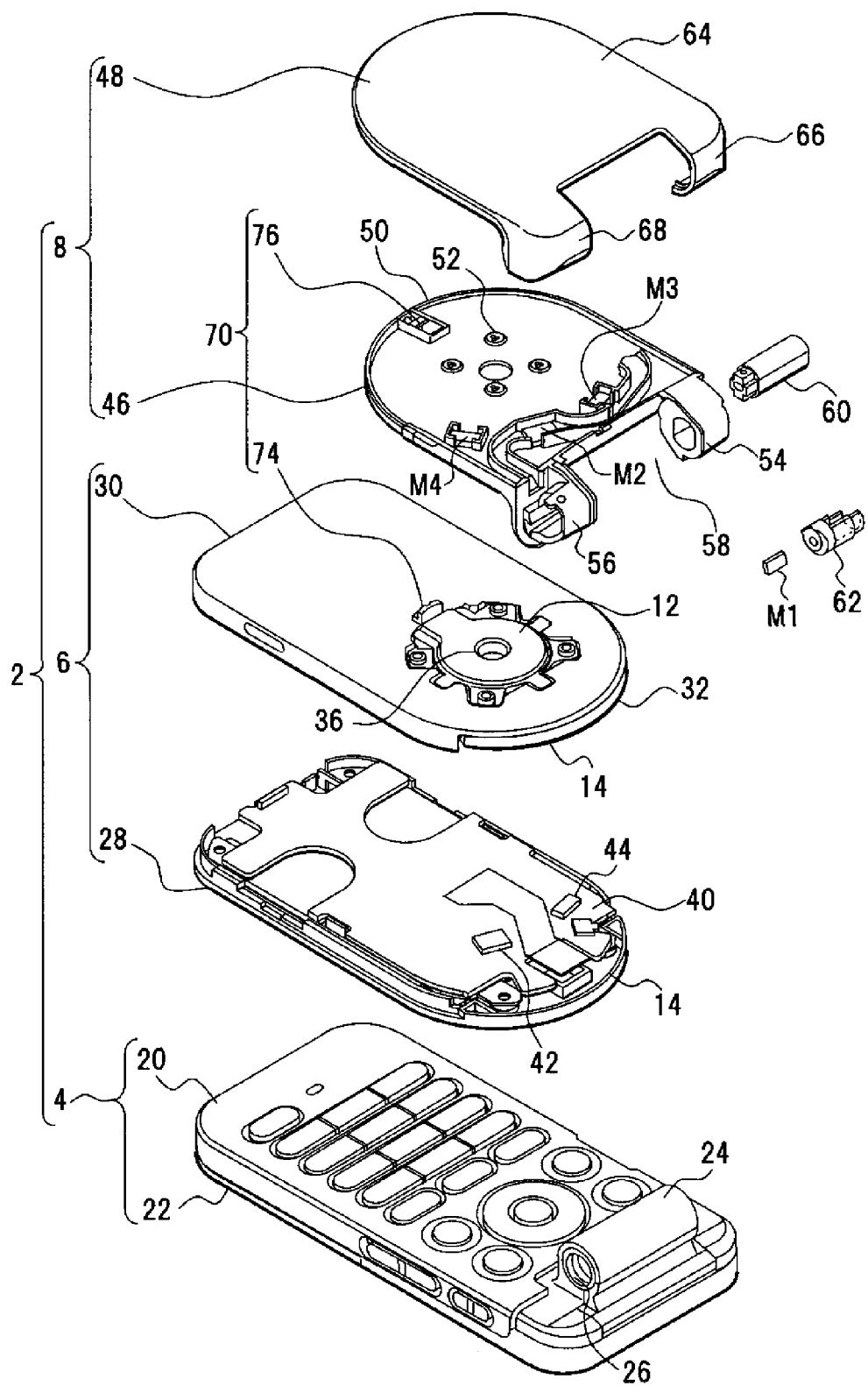
FIG. 8 is an exploded perspective view of the portable terminal apparatus.
Figure 9:
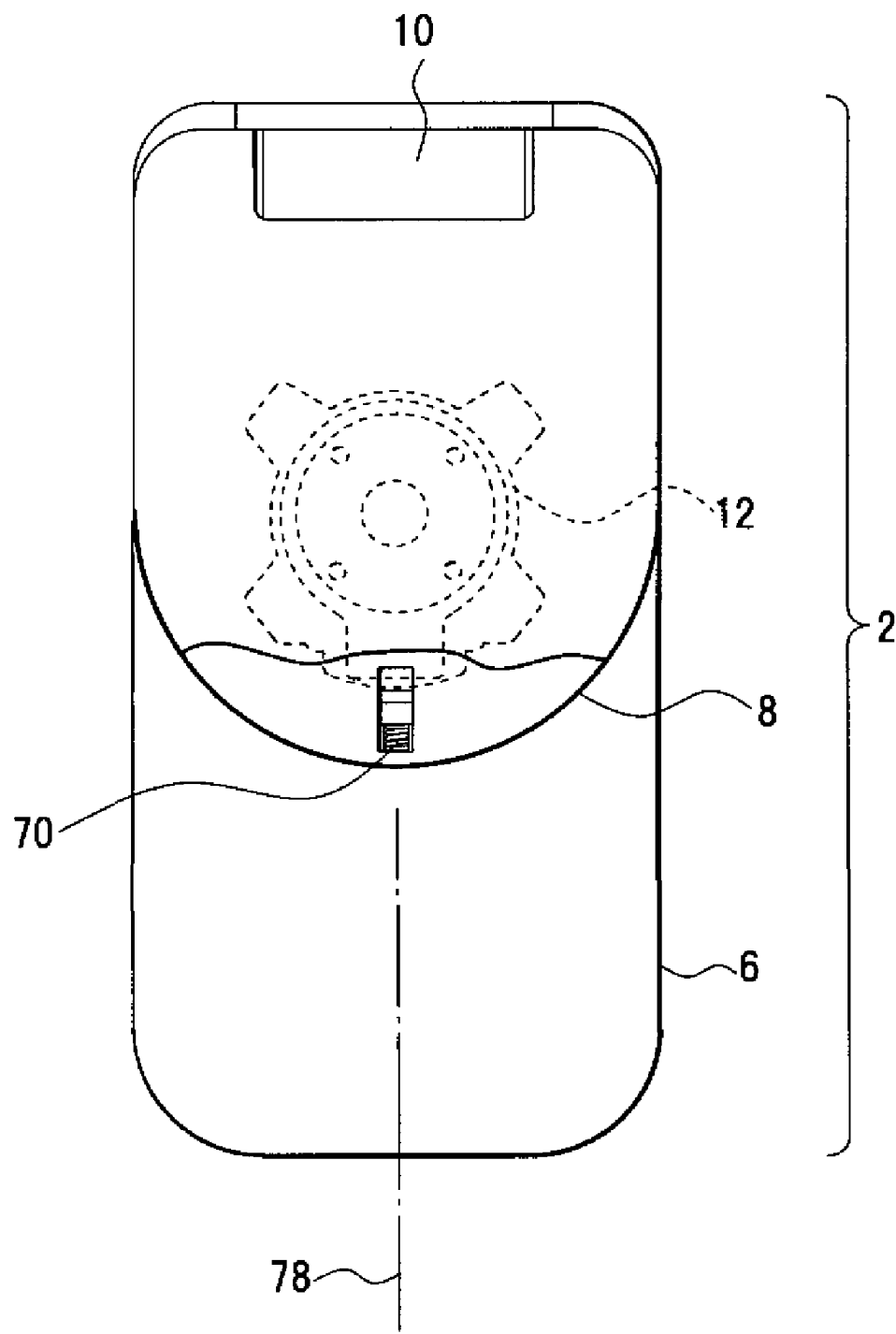
FIG. 9 depicts the position of a rotation lock mechanism of the portable terminal apparatus.
Figure 10:
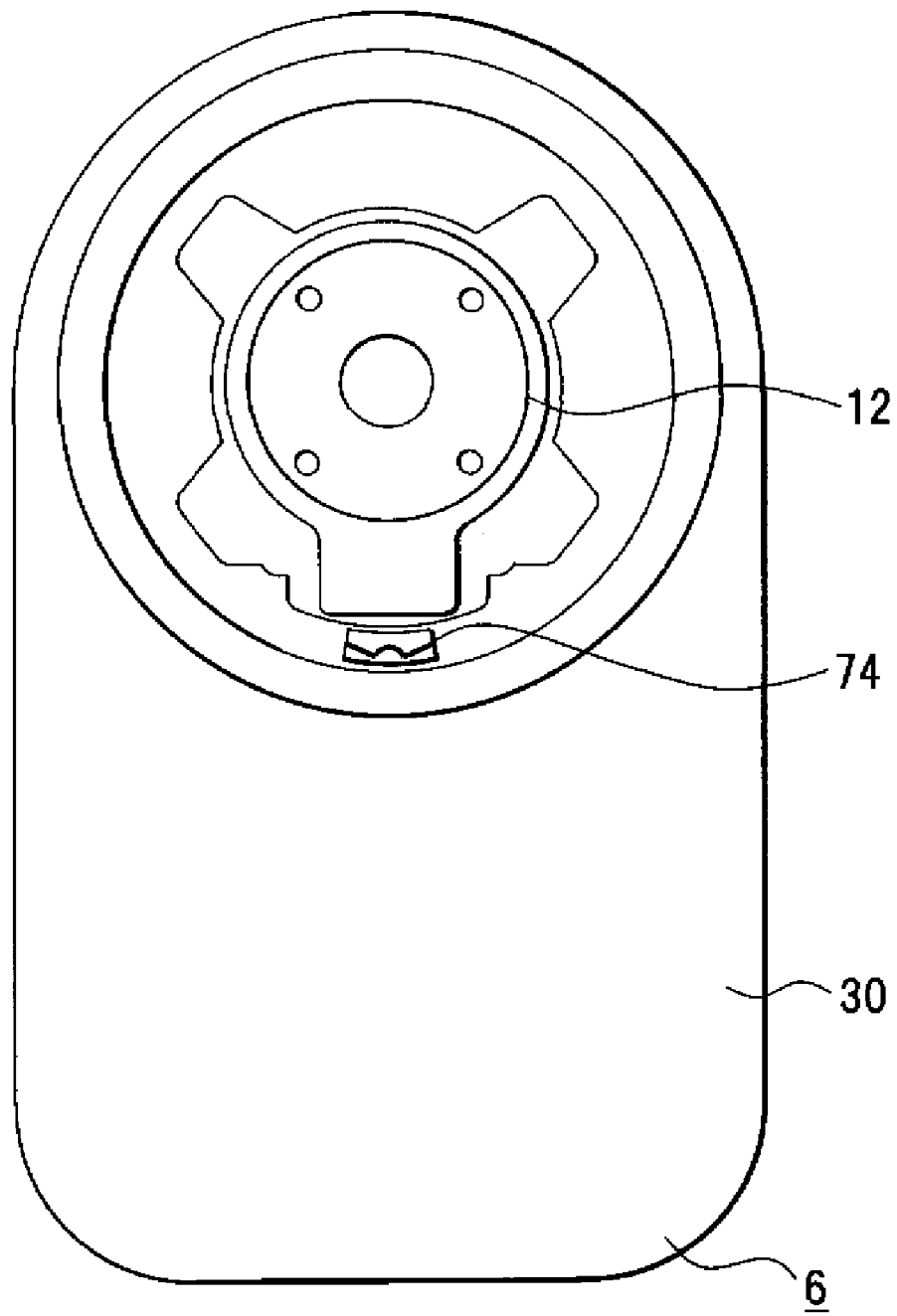
FIG. 10 depicts the upper face side of a movable rear case.
Figure 11:
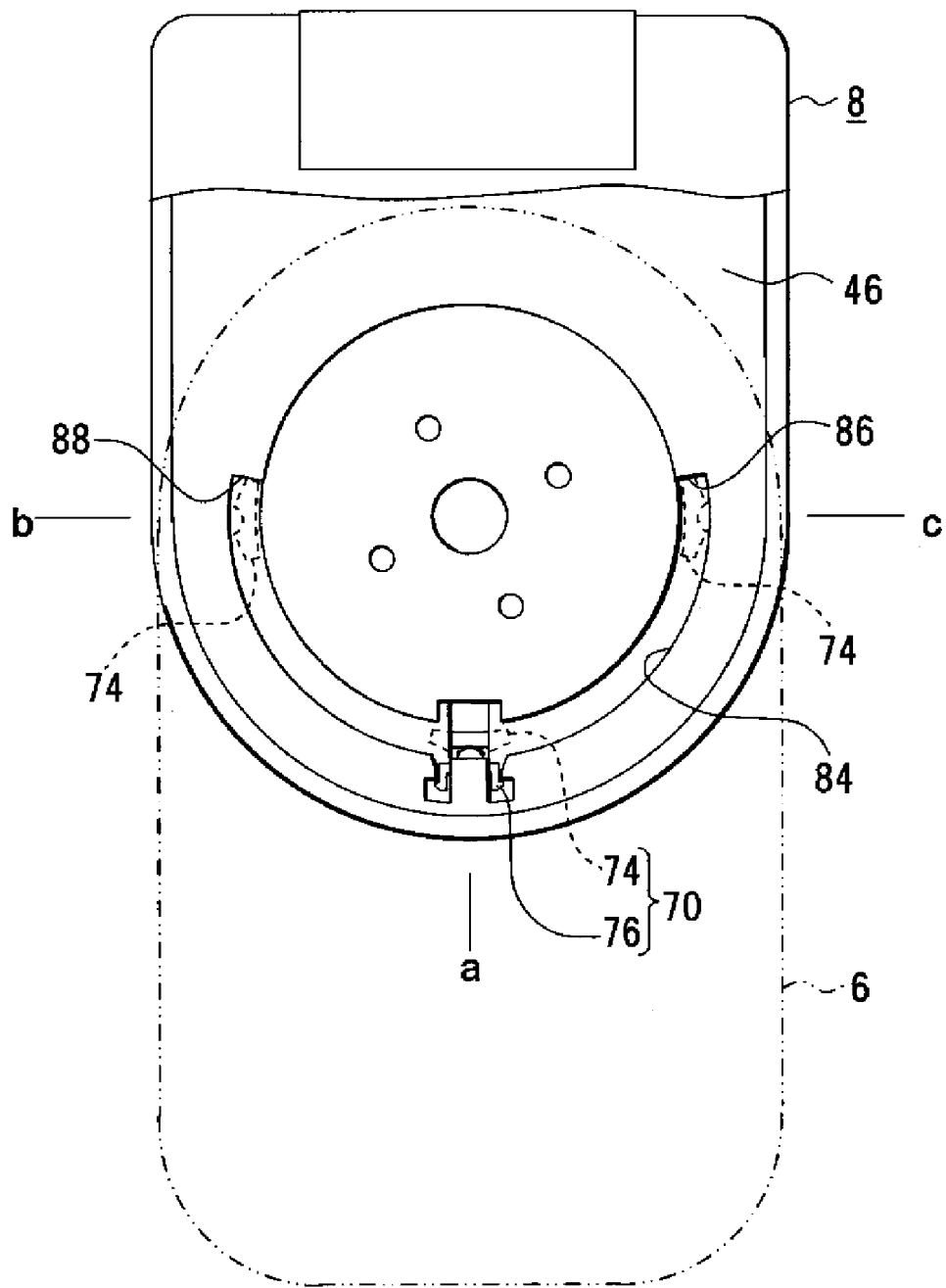
FIG. 11 depicts the back face side of a movable arm.
Figure 12:
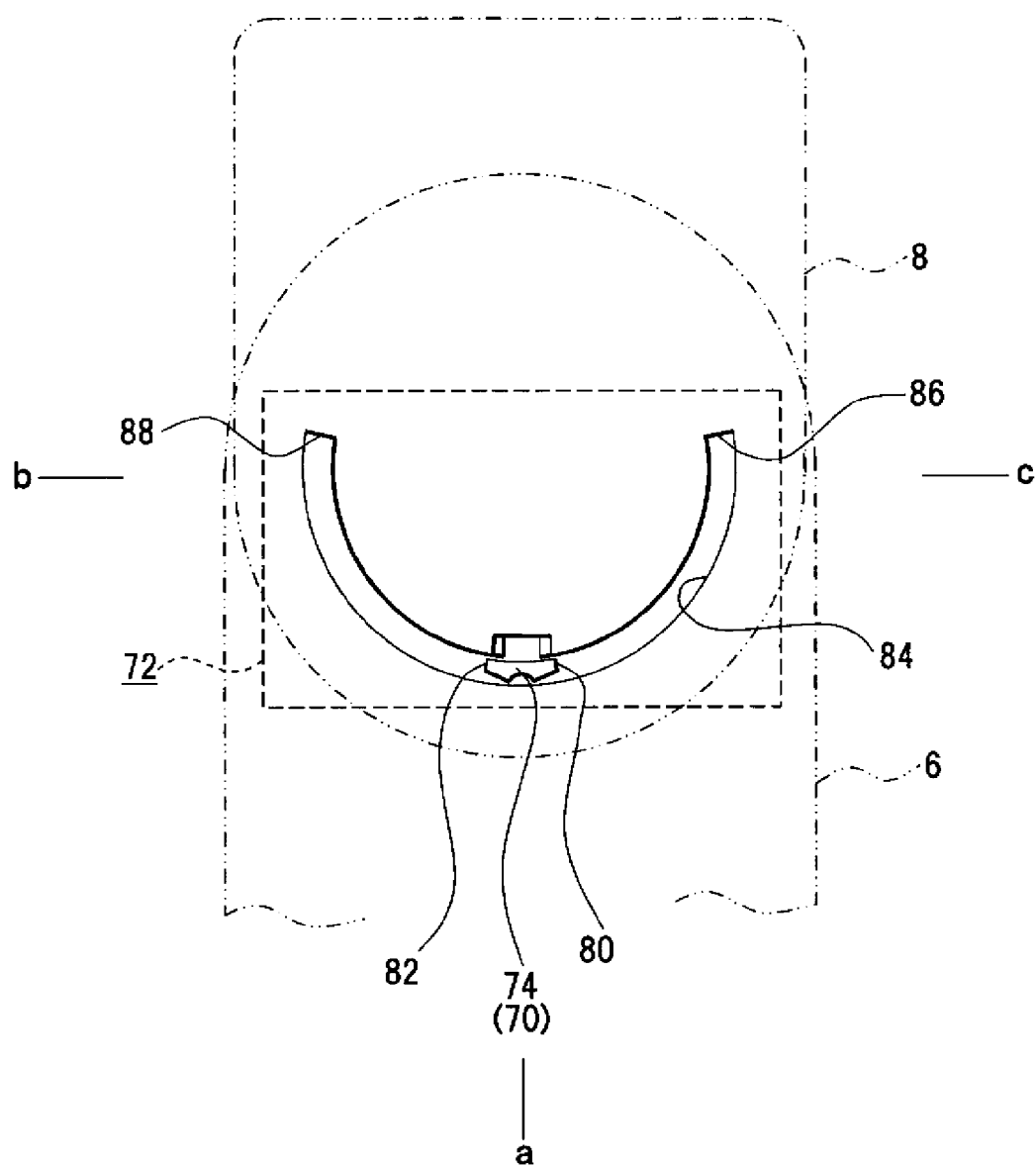
FIG. 12 depicts a stopper structure and a central stopping position.
Figure 13:
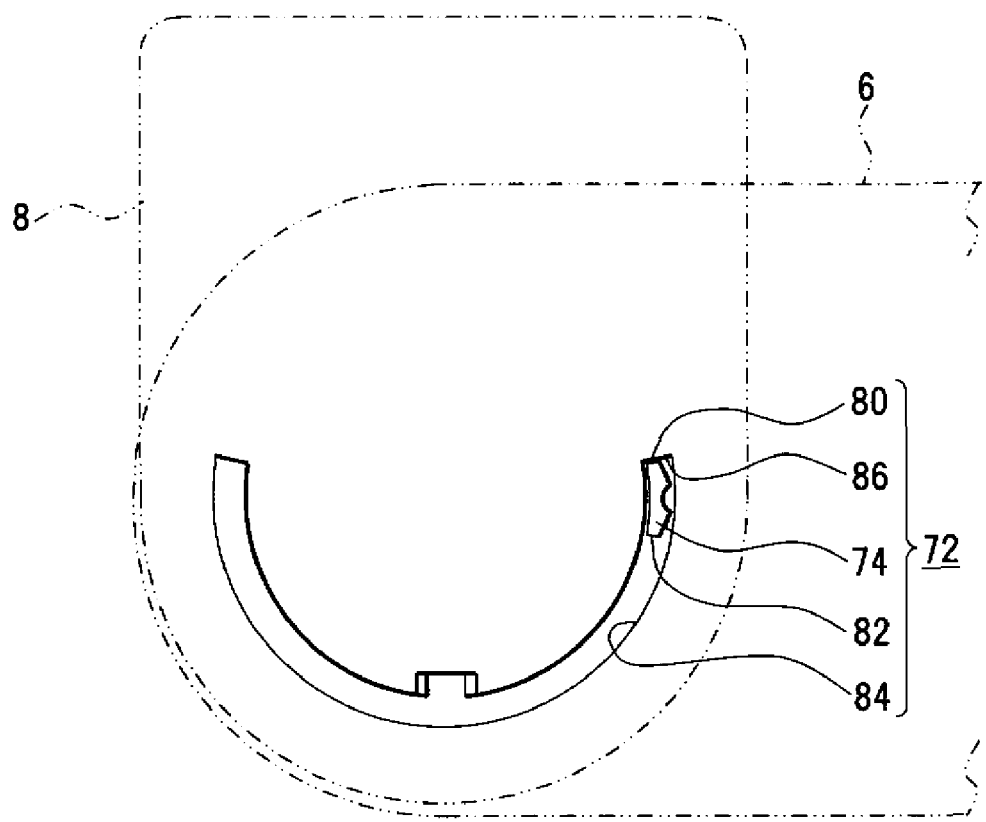
FIG. 13 depicts an operation of the stopper.
Figure 14:
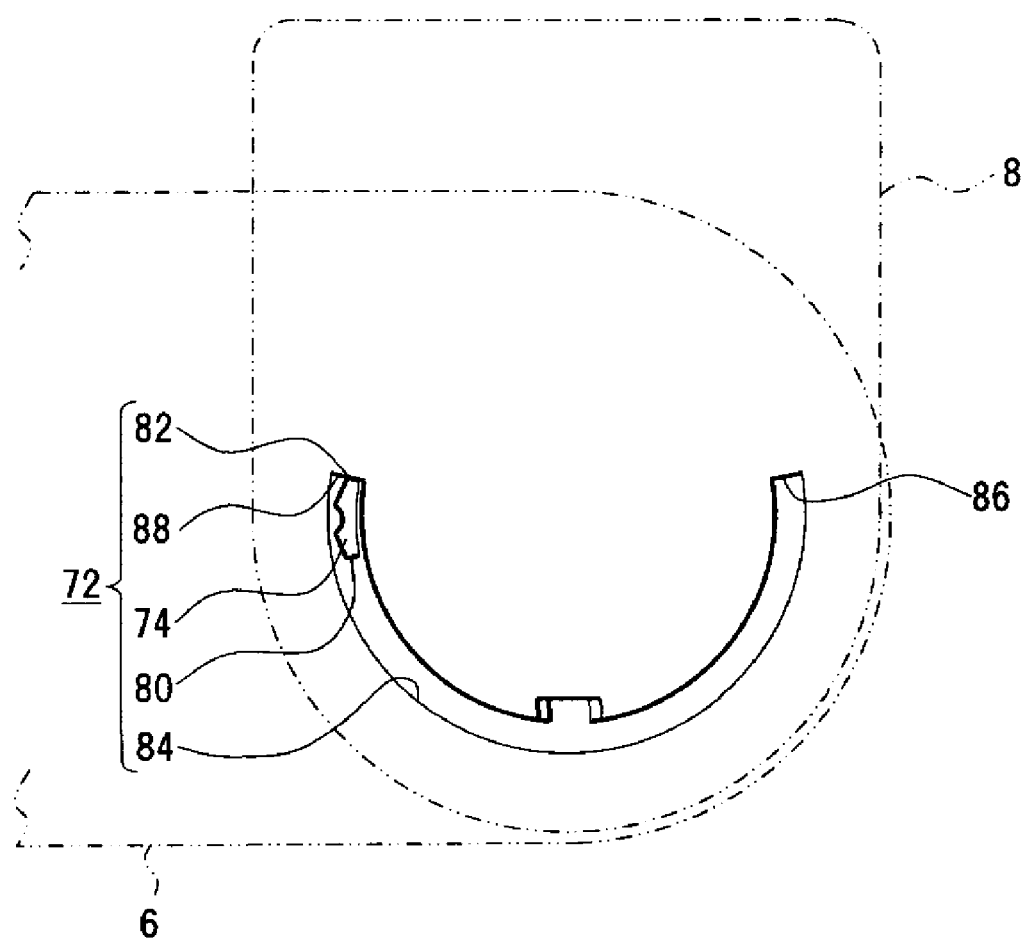
FIG. 14 depicts an operation of the stopper.

A configurative example of the portable terminal apparatus 2 will then be described with reference to FIGS. 8 to 14. FIG. 8 is an exploded perspective view of the portable terminal apparatus 2, FIG. 9 depicts the position of a rotation lock mechanism of the portable terminal apparatus 2, FIG. 10 depicts the upper face side of a movable rear case of the movable case unit, FIG. 11 depicts the back face side of the movable arm, and FIGS. 12, 13 and 14 depict a stopper structure and the operation thereof. In FIGS. 8 to 14, the same components as described in FIGS. 1 to 6 are denoted by the same reference numerals.

The fixed case unit 4 has a fixed front case 20 and a fixed rear case 22. On the side of an edge in the longitudinal direction of the fixed front case 20, a bearing 24 of the hinge 10 is formed, which bearing 24 is provided with a bearing hole 26. The fixed rear case 22 carries a fixed board, etc.

The movable case unit 6 has a movable front case 28, and a movable rear case 30, to which the rotary module 12 is fitted to be close to a circular portion 32 of the movable rear case 30. The rotary module 12 has a through-hole 36 formed at the rotation center of the rotary module 12, where the through-hole 36 is used for allowing a cable (not shown) to pass therethrough.

A movable board 40 is mounted on the movable front case 28. The movable board 40 is fitted with the rotation sensors 42 and 44 that detect the direction of rotation and the rotation angle θ of the movable case unit 6.

The movable arm 8 has an arm 46 and an arm cover 48. On the side of a circular portion 50 of the arm 46, the rotary module 12 and the movable rear case 30 of the movable case unit 6 are fixed with a fixing means, for example, with a plurality of screws 52. The arm 46 has bearings 54 and 56 of the hinge 10, and the bearing 24 of the fixed case unit 4 is inserted in a gap 58 between the bearings 54 and 56. In the bearing 54, a hinge module 60 is inserted and fixed as a hinge shaft reaching the bearing 24 of the fixed case unit 4. Likewise, in the bearing 56, a hinge module 62 is inserted and fixed as a hinge shaft. The hinge module 62, allowing the cable (not shown) to pass therethrough, may be provided as a cable guide.

The arm 46 of the movable arm 8 is provided with three magnets M2, M3, and M4, which are arranged on the same track on which the rotation sensors 42 and 44 are arranged on the movable front case 28 of the movable case unit 6. These rotation sensors 42 and 44 and the magnets M2, M3, and M4 detect the central position a, the rightward rotation position b, or the leftward rotation position c of the movable case unit 6 when it rotates.

The arm cover 48 has a lid 64 that covers the upper face of the arm 46, and coverings 66 and 68 that cover the bearings 54 and 56, respectively. The lid 64 is joined to the arm 46 to protect the upper face of the arm 46, and the coverings 66 and 68 cover the peripheral walls of the bearings 54 and 56 to reinforce and protect the bearings 54 and 56.

The hinge 10 is composed of the bearing 24 of the fixed case unit 4, the bearings 54 and 56 of the movable arm 8, and the hinge modules 60 and 62, as described above. The hinge 10 so supports the movable arm 8 on the fixed case unit 4 that the movable arm 8 can open and close (can open and close up to an angle of 170 degrees according to the present embodiment). The rotation module 12 so supports the movable case unit 6 on the movable arm 8 that the movable case unit 6 can rotate.

The movable arm 8, which so supports the movable case unit 6 as to make it rotatable via the rotation module 12, and the movable case unit 6, which is rotatable on the movable arm 8 via the rotation module 12, are provided with a rotation lock mechanism 70 (FIG. 9, etc.) and a stopper mechanism 72 (FIG. 12, etc.). The rotation lock mechanism 70 determines the central position of the leftward/rightward allowable rotation angles of each 90 degrees of the movable case unit 6, that is, determines the position of zero degrees, and the stopper mechanism 72 determines a range of rotation at the leftward/rightward allowable rotation angles of each 90 degrees.

According to the present embodiment, as shown in FIG. 8, a pin engaging portion 74 of the rotation lock mechanism 70 is formed integrally on the movable rear case 30. As shown in FIG. 10, the pin engaging portion 74 is disposed outside the rotation module 12 to project from the upper face of the movable rear case 30. A lock pin 76, which is engaged with the pin engaging portion 74, is attached to the arm 46 of the movable arm 8, where, according to the present embodiment, the lock pin 76 is disposed inside the arm 46.

As shown in FIG. 11, the rotation lock mechanism 70 is the mechanism that fixes and holds the movable case unit 6, which is supported rotatably on the movable arm 8 via the rotation module 12, at the position where the movable case unit 6 matches the fixed case unit 4, i.e., the central position a. In this case, the movable case unit 6 is fixed and held on the movable arm 8 to the effect that a user is allowed to know the position of holding is a reference position, and to the extent that the movable case unit 6 does not move until the user applies a leftward or rightward force to the movable case unit 6 with a will of rotating it. The movable case unit 6 is held here, therefore, under no assumption of locking the movable case unit 6 to render it incapable of moving, but with such firmness that prevents the movable case unit 6 from rotating under a load for ordinary rotation operation.

According to the present embodiment, to fix and hold the movable case unit 6 at the position of matching the movable case unit 6 to the fixed case unit 4, i.e., the central position a, the rotation lock mechanism 70 is disposed on a virtual axis 78 (FIG. 9) that penetrates the rotational center Oa of the rotary module 12 fixed to the movable arm 8. In this case, the axis 78 is determined to be on the centerline of the fixed case unit 4 and the movable case unit 6.

As shown in FIG. 12, the stopper mechanism 72 is the structure that sets the maximum rotation angle of the movable case unit 6 in rotation from the rotation lock mechanism 70 at the center to the left and right and that stops the movable case unit 6 at the maximum rotation angle. According to the present embodiment, the pin engaging portion 74 is used also as a stopper, and has stopper faces 80 and 82.

In correspondence to the pin engaging portion 74, an arcuate slot 84, into which the pin engaging portion 74 is inserted, is formed on the movable arm 8. The slot 84 has stoppers 86 and 88 formed at the ends of the slot 84, where the stopper faces 80 and 82 of the pin engaging portion 74 are brought in contact with the stoppers 86 and 88, respectively. Specifically, the stopper face 80 hits against the stopper 86 and the stopper face 82 hits against the stopper 88 to stop the rotation of the movable case unit 6. These positions of stoppage of the rotation are equivalent to the positions b and c that are situated at 90 degrees at the left and right respectively relative to the central position a.

According to the above configuration, when the movable case unit 6 at the position as shown in FIG. 12 is rotated leftward, the stopper face 80 of the pin engaging portion 74 hits against the stopper 86, which is an end of the slot 84, to bring the movable case unit 6 to a stop at an angular position of 90 degrees at the left, as shown in FIG. 13. When the movable case unit 6 at the position as shown in FIG. 12 is rotated to rightward, the stopper face 82 of the pin engaging portion 74 hits against the stopper 88, which is an end of the slot 84, to bring the movable case unit 6 to a stop at an angular position of 90 degrees at the right, as shown in FIG. 14.

Figure 15:
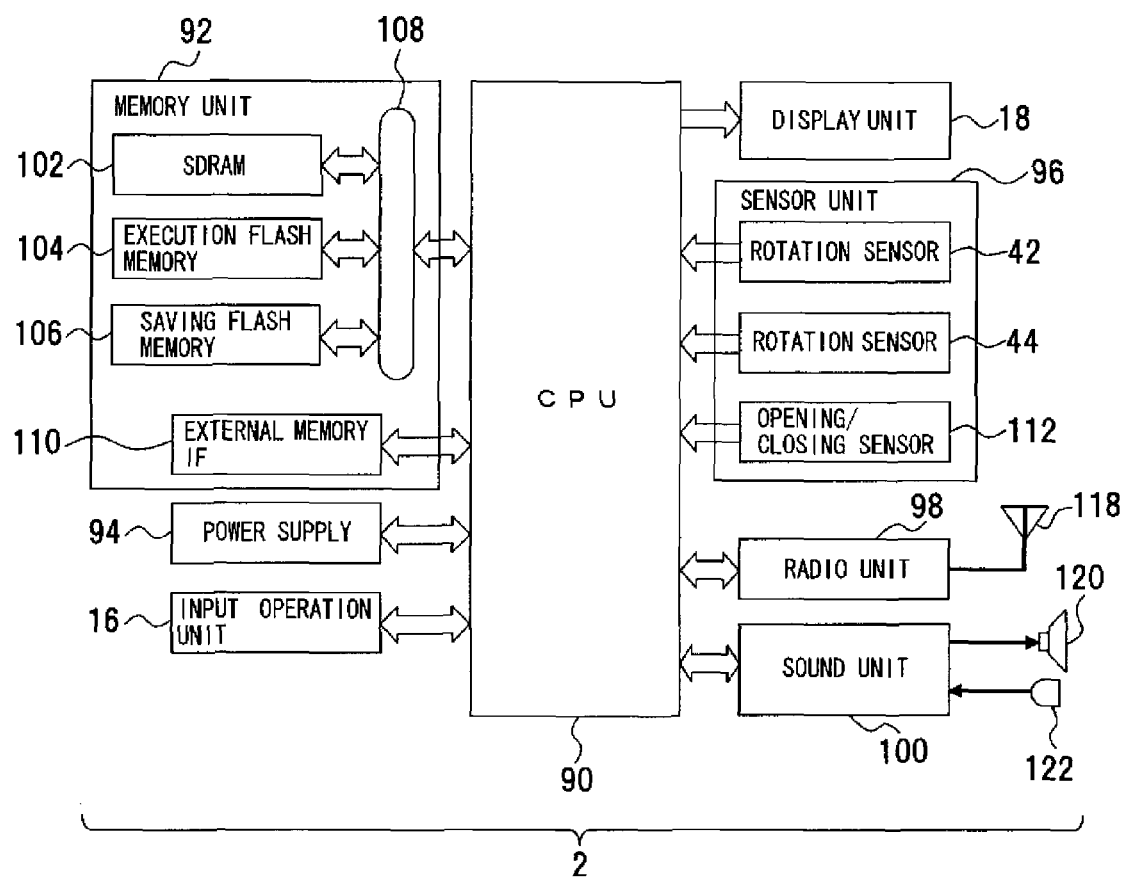
FIG. 15 depicts an example of the circuit structure of the portable terminal apparatus.

The circuit configuration of the portable terminal apparatus 2 will then be described with reference to FIG. 15. FIG. 15 is a block diagram of an electric circuit unit of the portable terminal apparatus 2. In FIG. 15, the same components as described in FIGS. 1 to 14 are denoted by the same reference numerals.

In addition to a telephone function and an e-mail transmission/reception function, the portable terminal apparatus 2 also has a control function for changing a display form in response to the above mentioned operation of opening and closing the fixed case unit 4 and movable case unit 6, rotating the movable case unit 6, etc.

The portable terminal apparatus 2 includes an input operation unit 16, the display unit 18, a CPU (Central Processing Unit) 90, a memory unit 92, a power supply 94, a sensor unit 96, a radio unit 98, and a sound unit 100. The input operation unit 16 has a plurality of keys, and is used for inputting characters, such as phone numbers and e-mail texts. The display unit 18 displays a stand-by screen, an e-mail making screen, an e-mail reception screen, etc., and is controlled to take a different display form according to the opened and closed state and rotation angle of the movable case unit 6.

The CPU 90 executes a program stored in the memory unit 92 to carry out various control such as taking in detection information and control information including input to the input operation unit 16 and a detection signal from the sensor unit 96, writing and reading information in and out of the memory unit 92, and controlling display by the display unit 18, etc.

The memory unit 92 stores a display control program, other programs, and various data. According to the present embodiment, the memory unit 92, serving as a recording medium, is composed of a SDRAM (Synchronous Dynamic Random-Access Memory) 102, an execution flash memory 104, and a saving flash memory 106, which are connected to the CPU 90 via a bus 108.

The SDRAM 102 provides a work area, where the CPU 90 executes a program that is read out of the saving flash memory 106 into the SDRAM 102, and generates a computing process and control information. The execution flash memory 104 stores various data to build a data base, etc. The saving flash memory 106 stores various programs including an OS (Operating System) program and a display control program.

An external memory, such as a memory card, is connected to an external memory IF (Interface) 110. The external memory stores address data, such as phone numbers and e-mail addresses, various contents, etc.

The power supply 94 includes a battery; and a battery charge circuit, a stabilization circuit, a power supply control circuit, etc, which are controlled by the CPU 90. The power supply 94 supplies the power to various function units such as the radio unit 98.

The sensor unit 96 detects the opening and closing of the movable case unit 6 by the movable arm 8, and the rotation angle θ (0 to 90 degrees to the left and right) and rotation direction of the movable case unit 6. The sensor unit 96 includes an opening/closing sensor 112, and the rotation sensor 42 and 44. The opening/closing sensor 112 detects the presence and absence of magnetic flux from a magnet M1 (FIG. 8) to generate detection output indicating whether the movable case unit 6 is in the opened state or in the closed state. The rotation sensors 42 and 44 are disposed on the movable board 40 of the movable case unit 6, and the three magnets M2, M3, and M4 (FIG. 8) are disposed at the position corresponding to the position of the rotation sensors 42 and 44 on the track on the rotating movable case unit 6.

For example, the magnet M2 overlaps the rotation sensor 42 and the magnet M3 overlaps the rotation sensor 44 when the rotation sensors 42 and 44 are in the central position a (FIG. 3) of the movable case unit 6. As a result, the rotation sensors 42 and 44 generate output indicating that they are in the central position a of the movable case unit 6. Being in the central position a, therefore, the rotation sensors 42 and 44 generate, for example, identical output at a high level or a low level. When the movable case unit 6 is rotated rightward or leftward, magnetic forces from the magnets M2, M3, and M4 that act on the rotation sensors 42 and 44 change, which causes the rotation sensors 42 and 44 to generate output corresponding to the change. This output change occurs when the rotation angle θ reaches 20 degrees at the left and right, so that the output change indicates the direction of rotation to the right or to the left. Thus, the rotation sensors 42 and 44 generate output indicating the position at 90 degrees at the right or the position at 90 degrees at the left. For example, high level output from the rotation sensor 42 combined with low level output from the rotation sensor 44 indicates the position at 90 degrees at the right, and low level output from the rotation sensor 42 combined with high level output from the rotation sensor 44 indicates the position at 90 degrees at the left.

The radio unit 98 transmits and receives communication data, such as voice messages, e-mails, etc., through an antenna 118, executing processes of modulating voice and data, demodulating voice and data carried on a radio signal, etc.

The sound unit 100 puts out an incoming voice through a speaker 120, or takes in and amplifies a transmission voice from a microphone 122.

Figure 16:
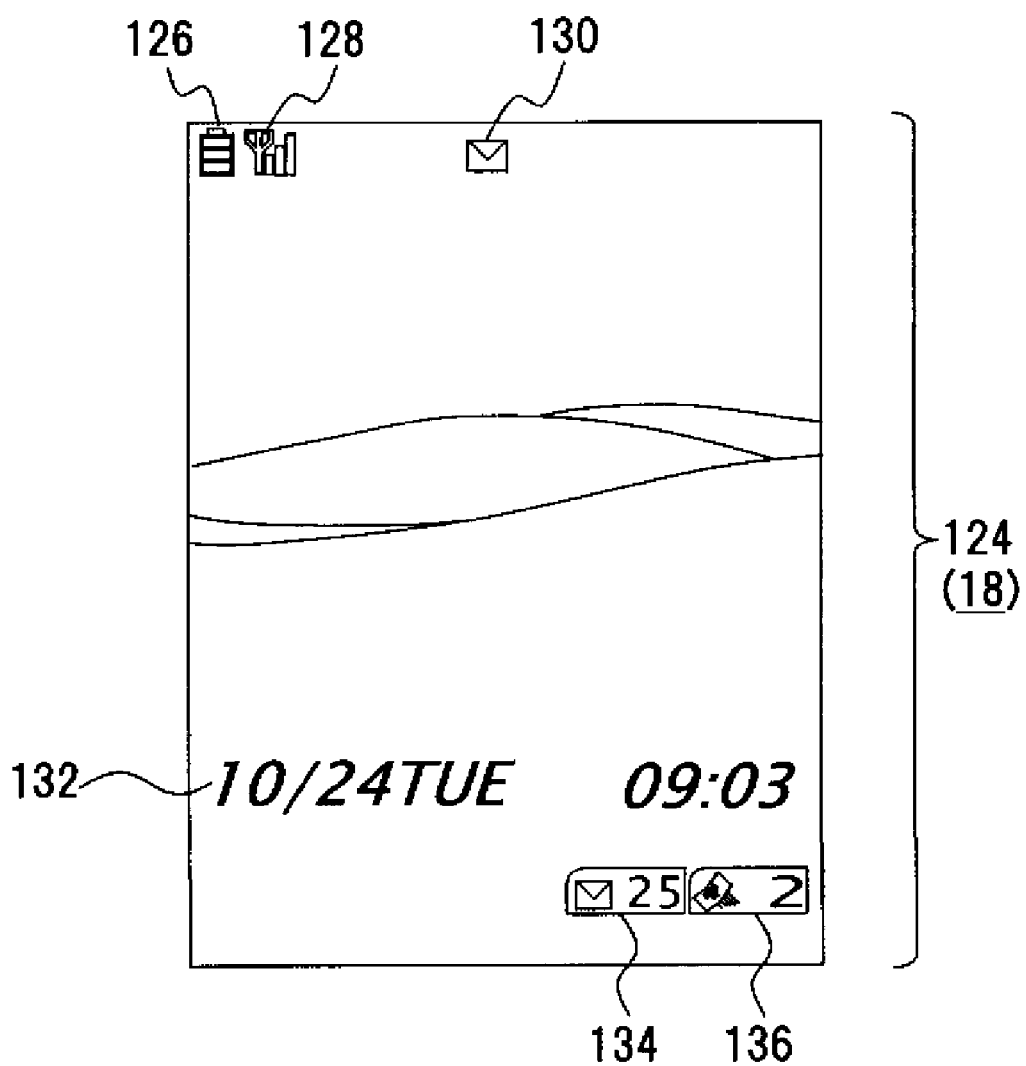
FIG. 16 depicts a vertical main display screen in a stand-by state.
Figure 17:
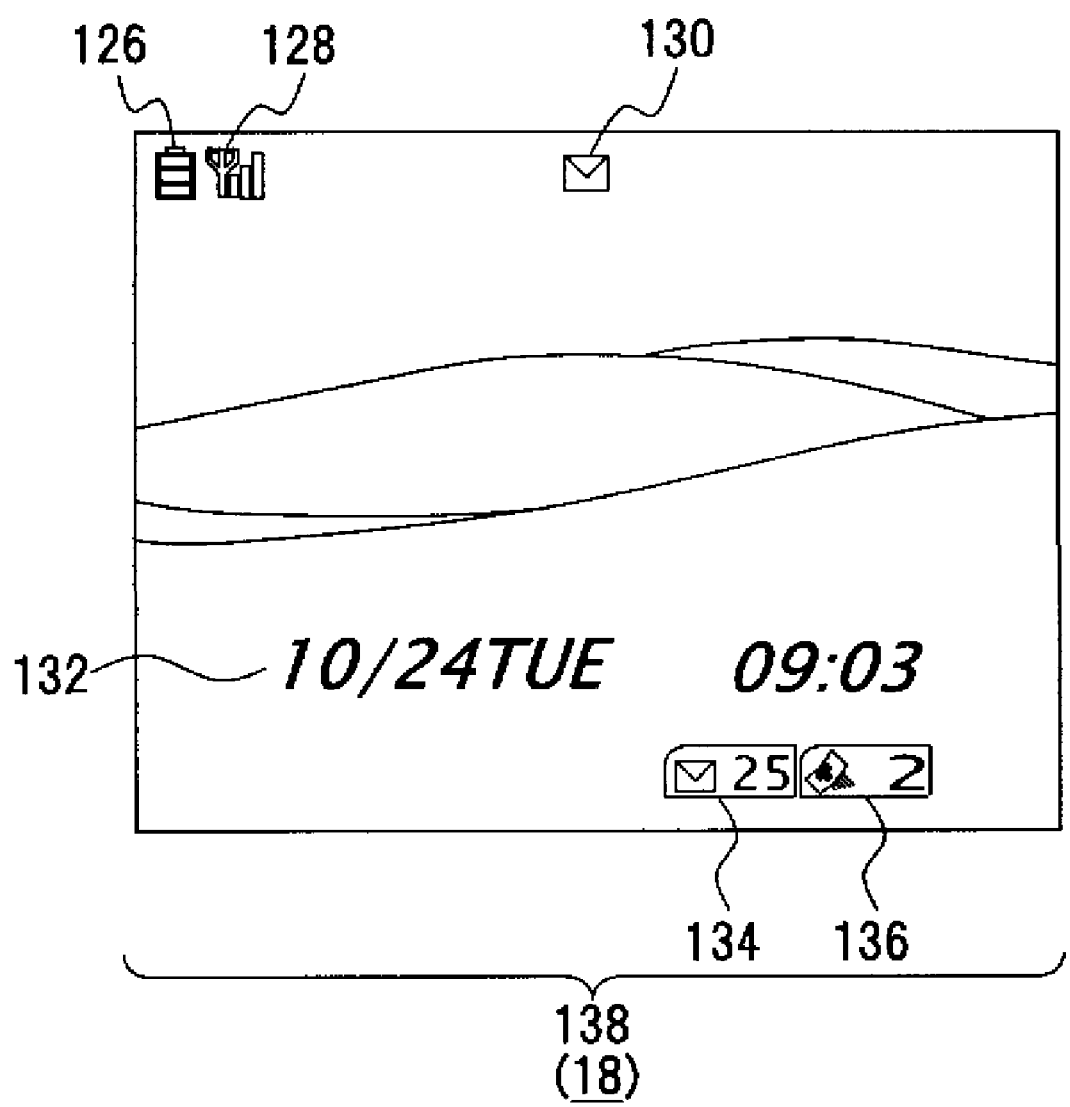
FIG. 17 depicts a right horizontal main display screen in the stand-by state.
Figure 18:
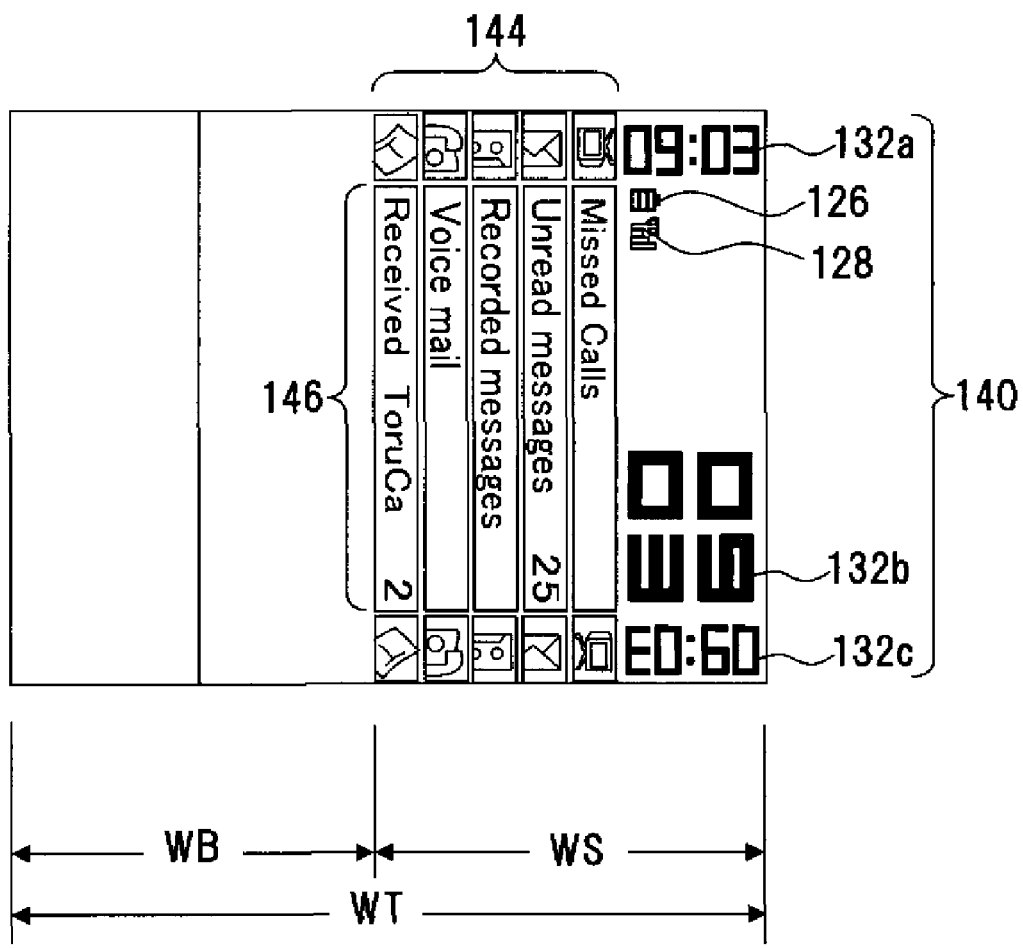
FIG. 18 depicts a right sub-display screen.
Figure 19:
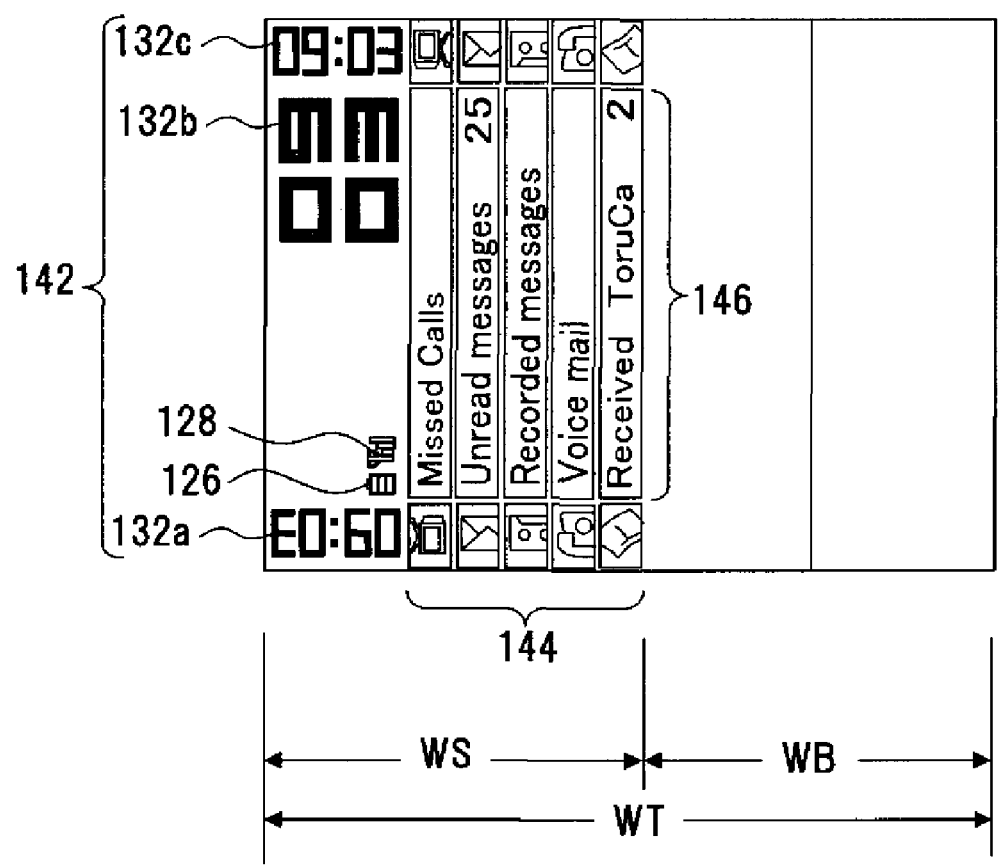
FIG. 19 depicts a left sub-display screen.
Figure 20:
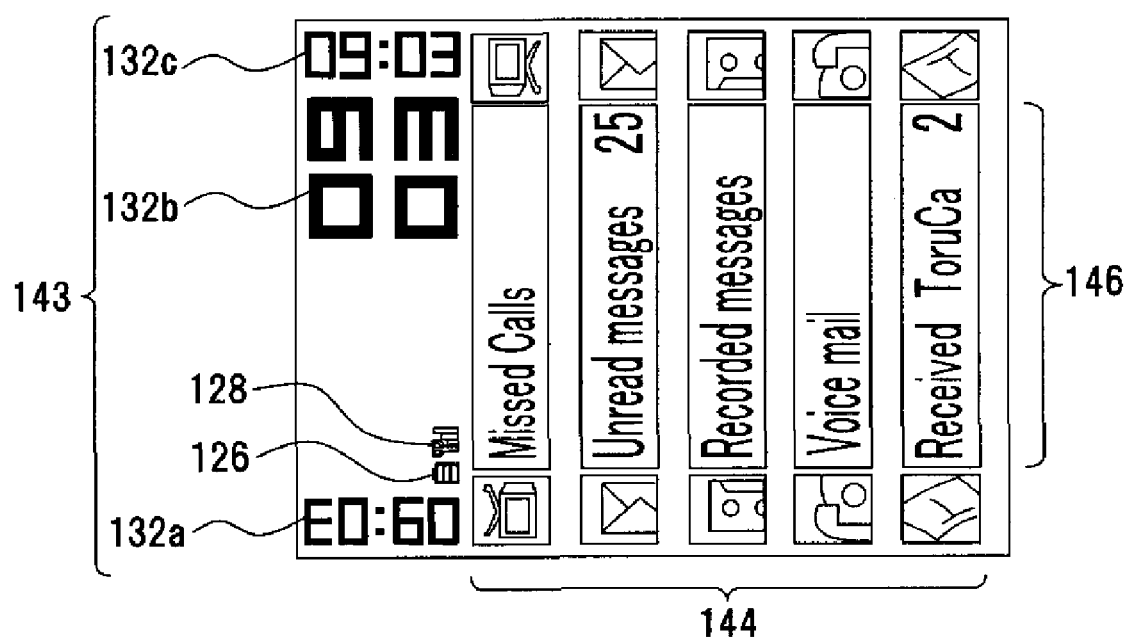
FIG. 20 depicts an example of a horizontal main display screen.

The display form of the display unit 18 will then be described with reference to FIGS. 16 to 24. FIG. 16 depicts a vertical main display screen in a stand-by state, FIG. 17 depicts a right horizontal main display screen in the stand-by state, FIG. 18 depicts a right sub-display screen, FIG. 19 depicts a left sub-display screen, FIG. 20 depicts an example of a horizontal main display screen, and FIGS. 21 to 24 depict sub-display screens. In FIGS. 16 to 24, the same components as described in FIGS. 1 to 15 are denoted by the same reference numerals.

The display form of the display unit 18 changes as the movable case unit 6 opens and closes and/or rotates. When the movable case unit 6 is in the opened state, the display unit 18 displays a main display screen. This main display screen includes a vertically elongated vertical main display screen and a horizontally elongated horizontal main display screen, which are defined with regard to the axis of the fixed case unit 4. A horizontal main display screen includes a right horizontal main display screen and a left horizontal main display screen, which are defined according to a rotation angle with regard to the axis of the fixed case unit 4. When the movable case unit 6 is in the closed state, the display unit 18 displays a sub-display screen when the movable case unit 6 rotates to reach the given angle. A sub-display screen includes a right sub-display screen and a left sub-display screen, which are so defined with regard to the axis of the fixed case unit 4 that the right sub-display screen is at the right of the axis and the left sub-display screen is at the left of the axis. Though different in forms, these screens present the same display contents.

(1) Display Form of a Main Display Screen

When the movable case unit 6 is in the opened state, the display unit 18 displays a main display screen. In this case, when the movable case unit 6 shows zero rotation angle (stays at the central position a as the reference point), the display unit 18 displays a vertically elongated vertical main display screen 124, as shown in FIG. 16. This vertical main display screen 124 is a display screen in the stand-by state. The vertical main display screen 124 thus exhibits a battery mark 126 representing power remaining in a battery, an electric wave reception intensity mark 128 representing the intensity of received electric wave, an e-mail mark 130 representing the presence and absence of an incoming e-mail, a date indication 132 representing a date, the day of the week, and time, an unread e-mail mark 134 representing the presence and number of unread e-mails, a mark 136 representing other information, etc.

When the movable case unit 6 in the opened state is rotated rightward, the display unit 18 displays a right horizontal main display screen 138 at the position where the rotation angle is 90 degrees with regard to the axis of the fixed case unit 4, as shown in FIG. 17. This right horizontal main display screen 138 is a display screen in the stand-by state as the vertical main display screen 124 is. The right horizontal main display screen 138, therefore, also exhibits the battery mark 126, the electric wave reception intensity mark 128, the e-mail mark 130, the date indication 132, the unread e-mail mark 134, the mark 136, etc., which are arranged sideways.

When the movable case unit 6 in the opened state is rotated leftward, the display unit 18 displays a left horizontal main display screen at the position where the rotation angle is 90 degrees with regard to the axis of the fixed case unit 4. The left horizontal main display screen in the stand-by state is identical with the right horizontal main display screen 138, as shown in FIG. 17.

If the movable case unit 6 is folded onto the fixed case unit 4, that is, brought into the closed state when the vertical main display screen 124 (FIG. 16) is displayed on the display unit 18 (when the movable case unit 6 shows zero rotation angle), display of the vertical main display screen 124 is canceled.

If the movable case unit 6 is folded onto the fixed case unit 4, that is, brought into the closed state (e.g., the state described with a continuous line in FIG. 6) when the right horizontal main display screen 138 (FIG. 17) is displayed on the display unit 18 (e.g., when the movable case unit 6 is in the state described with a continuous line in FIG. 5), the right horizontal main display screen 138 is changed in display form into a right sub-display screen (e.g., a right sub-display screen 140 shown in FIG. 18). Likewise, when a left horizontal main display screen is displayed on the display unit 18 (e.g., when the movable case unit 6 is in the state described with a broken line in FIG. 5), if the movable case unit 6 is folded onto the fixed case unit 4, that is, brought into the closed state, the left horizontal main display screen is changed in display form into a left sub-display screen (e.g., a left sub-display screen 142 shown in FIG. 19).

(2) Display Form of a Sub-Display Screen

Display by the display unit 18 is canceled when the movable case unit 6 is in the closed state. In this case, however, when the movable case unit 6 is rotated rightward from the central position a, the right sub-display screen 140 is displayed on the display unit 18, as shown in FIG. 18. If the movable case unit 6 is rotated leftward from the central position a, the left sub-display screen 142 shown in FIG. 19 is put on display.

Each right sub-display screen 140 and left sub-display screen 142 is a screen that provides a visible area sticking out of the fixed case unit 4 as a display area WS. In each right sub-display screen 140 and left sub-display screen 142, an invisible area overlapping the fixed case unit 4 is defined as a concealed area WB out of the total display area WT of the display unit 18, and the visible area sticking out of the fixed case unit 4 is utilized as the display area WS out of the total display area WT. The display contents of each right sub-display screen 140 and left sub-display screen 142 may be a part of the display contents of a main display screen. To prevent display information from becoming insufficient, however, the display contents identical with or substantially equal to the display contents of the main display screen are put out on the display area WS as the right sub-display screen 140 and the left sub-display screen 142.

In this case, each right sub-display screen 140 and left sub-display screen 142 is an instance of a stand-by screen, thus exhibiting the battery mark 126, the electric wave reception intensity mark 128, a plurality of time indications 132a, 132b, and 132c, a single or a plurality of icons 144 representing notices of incoming messages, the presence and absence and number of unread e-mails, etc., and a plurality of messages 146. The time indications 132a, 132b, and 132c represent the same contents but are displayed at different angles, which prevents a user from making such a mistake of seeing different contents at different angles of view, thus facilitates visibility and understanding of display contents.

When the movable case unit 6 is brought into the opened state as the right sub-display screen 140 (FIG. 18) or the left sub-display screen 142 (FIG. 19) is displayed on the display unit 18, for example, the display contents of each right sub-display screen 140 and left sub-display screen 142 may be put out on a horizontal main display screen 143 using the total display area WT, as shown in FIG. 20. Such display of the right sub-display screen 140 and left sub-display screen 142 and the horizontal main display screen 143 is merely an example. In the above case, a main display screen carrying changed display contents may be displayed, or the original contents may be displayed on a vertical main display screen.

Figure 21:
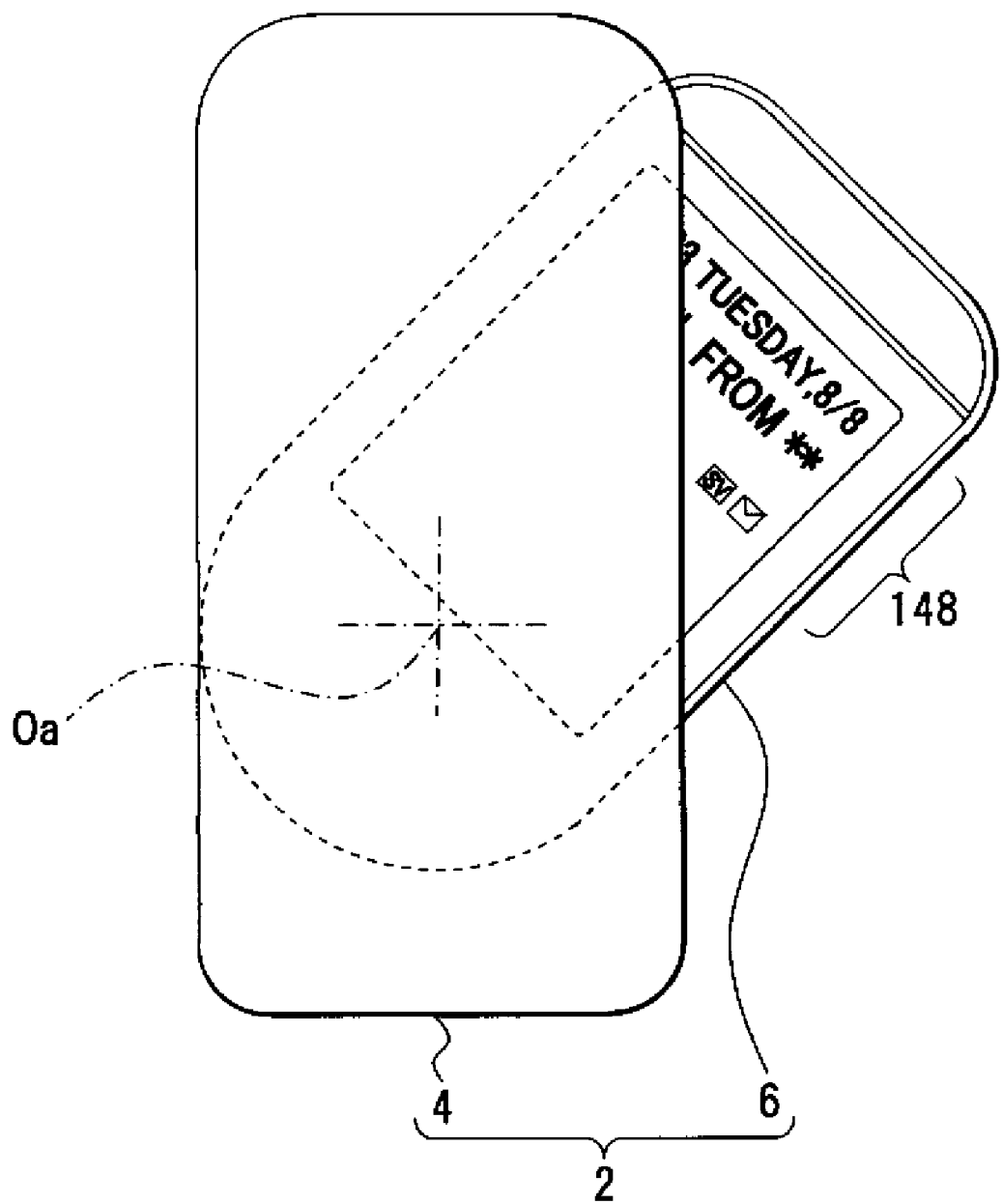
FIG. 21 depicts a right sub-display screen (reception of an incoming e-mail)

As shown in FIG. 21, when the movable case unit 6 is rotated rightward at the given angle, for example, at 20 degrees or larger while in the closed state, the display unit 18 starts to operate, causing the right sub-display screen 148 to appear when an incoming e-mail is received. When the movable case unit 6 is further rotated up to 90 degrees at the right, the entire part of the right sub-display screen 148 is exposed out of the fixed case unit 4, as shown in FIG. 22. As shown in FIG. 23, when the movable case unit 6 is rotated leftward at a given angle, for example, at 20 degrees or larger while in the closed state, the display unit 18 starts to operate, causing the left sub-display screen 150 to appear when an incoming e-mail is received. When the movable case unit 6 is further rotated up to 90 degrees at the left, the entire part of the left sub-display screen 150 is exposed out of the fixed case unit 4, as shown in FIG. 24.

In this case, both right sub-display screen 148 (FIG. 22) and left sub-display screen 150 (FIG. 24) exhibit the same contents informing of reception of an incoming e-mail, which include, for example, the date indication 132, and a notifying message 152 notifying of a received e-mail, an e-mail sender name, etc. A fluid message like the message 152 may not be displayed.

Figure 25:
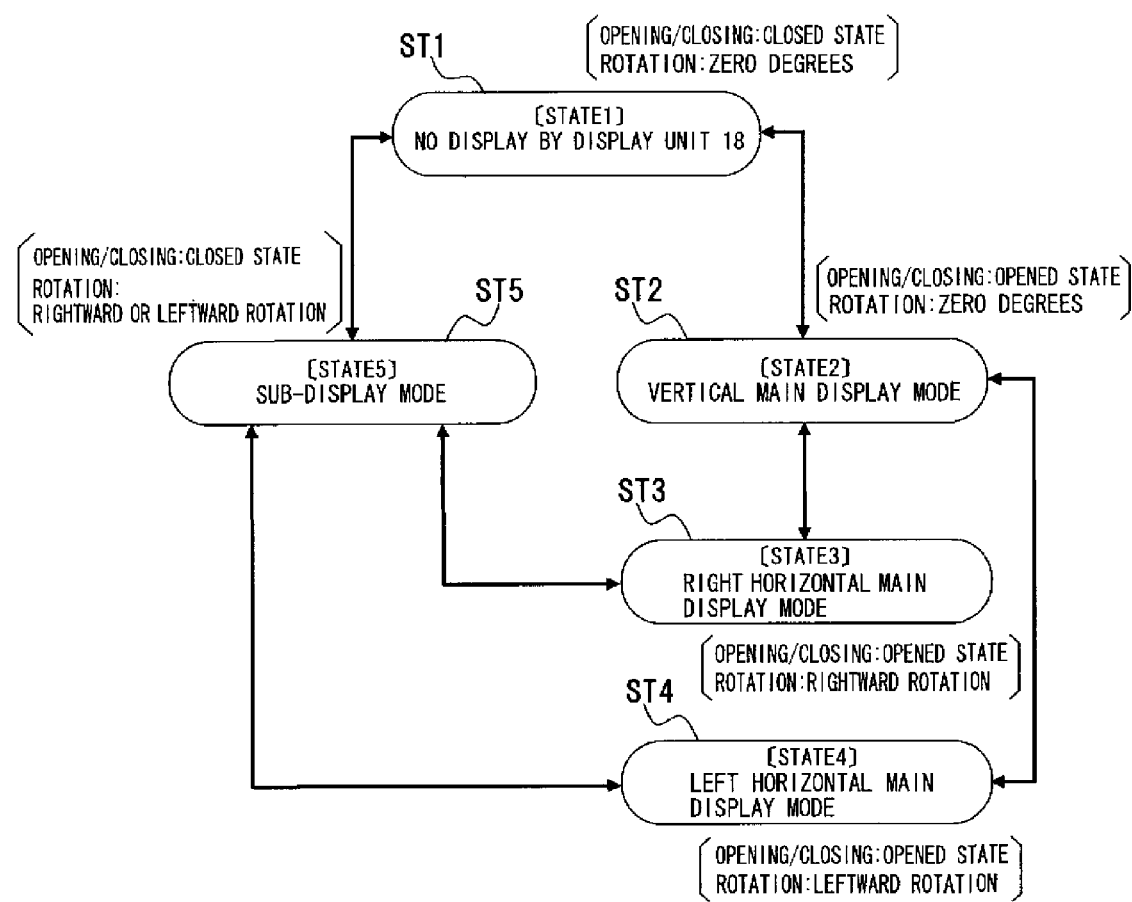
FIG. 25 is a state transition diagram depicting the transition of a display mode.

Display change by the display unit 18 will then be described with reference to FIG. 25. FIG. 25 is a state transition diagram depicting the transition of a display mode of the display unit 18. In FIG. 25, the same components as described in FIGS. 1 to 24 are denoted by the same reference numerals.

When the movable case unit 6 is in the closed state and shows zero rotation angle, the movable case unit 6 is at the central position a, which puts the display unit 18 in a state 1 for no display (ST1). When the display unit 18 changes from the no display state (state 1) into a state 2, where the movable case unit 6 is opened and in a state of rotation of zero degrees, the display mode of the display unit 18 changes into a vertical main display mode (ST2). When the display unit 18 executing the vertical main display mode changes into a state 3, where the state of rotation is rightward rotation, the display mode changes into a right horizontal main display mode (ST3). When the display unit 18 executing the vertical main display mode changes into a state 4, where the state of rotation is leftward rotation, the display mode changes into a left horizontal main display mode (ST4).

When the display unit 18 in the no display state (state 1), i.e., the closed state changes into a state 5 as the movable case unit 6 is rotated rightward or leftward, the display mode changes into a sub-display mode (ST5), which includes a right sub-display mode and a left sub-display mode each of which is defined according to a rotation direction.

When the movable case unit 6 is closed in the state 3 (right horizontal main display mode) or in the state 4 (left horizontal main display mode), the display mode changes into the state 5 (sub-display mode).

Through such mode change as described above, opening and closing the movable case unit 6 in the state of rotation brings a change in the display mode from the right horizontal main display mode or left horizontal main display mode into the sub-display mode, and from the sub-display mode into the right horizontal main display mode or left horizontal main display mode. Specifically, the mode change is carried out between the right horizontal main display mode and the right sub-display mode, and between the left horizontal main display mode and the left sub-display mode.

Figure 26:
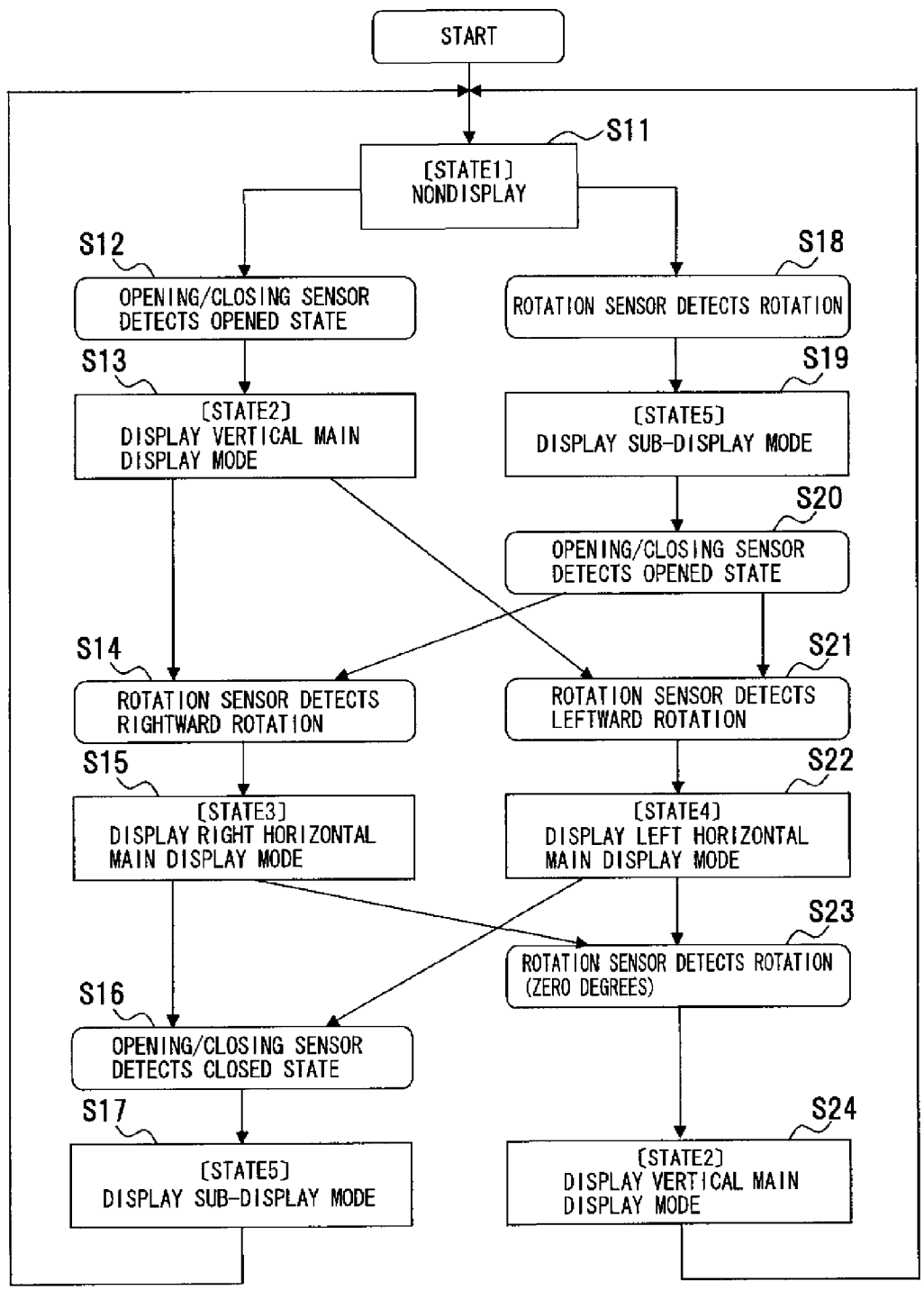
FIG. 26 is a flowchart of an example of a procedure of a display control program for the portable terminal apparatus.

Display change operation by the display unit 18 will then be described with reference to FIG. 26. FIG. 26 is a flowchart of an example of a procedure of a display control program for the display unit 18.

In the state 1 (no display), the display unit 18 is controlled into the no display state (step S11). In this state, detection information of the opened state from the opening/closing sensor 112 is taken in (step S12). Then, if the state of rotation of the movable case unit 6 is zero degrees, the display unit 18 changes into the state 2 to execute the vertical main display mode, which results in display of, for example, the vertical main display screen 124 on the display unit 18 (step S13).

During execution of the vertical main display mode, when the rotation sensors 42 and 44 detect the rightward rotation of the movable case unit 6 and information of the detection is taken in (step S14), the display unit 18 changes into the state 3 to execute the right horizontal main display mode, which results in display of, for example, the right horizontal main display screen 138 on the display unit 18 (step S15).

During execution of the right horizontal main display mode, when the opening/closing sensor 112 detects the closed state of the movable case unit 6 and information of the detection is taken in (step S16), the display unit 18 changes into the state 5 to execute the sub-display mode, which results in display of, for example, the right sub-display screen 140 (FIG. 18) or the right sub-display screen 148 (FIGS. 21 and 22) on the display unit 18 (step S17).

In the state 1 (no display) (step S11), when the movable case unit 6 rotates and detection information of rightward or leftward rotation from the rotation sensors 42 and 44 is taken in (step S18), the display unit 18 changes into the state 5 to execute the sub-display mode, which results in display of, for example, the right sub-display screen 140 (FIG. 18), the right sub-display screen 148 (FIGS. 21 and 22), or the left sub-display screen 142 (FIG. 19) on the display unit 18 (step S19).

During execution of the sub-display mode, when the movable case unit 6 is brought into the opened state, and the opening/closing sensor 112 detects the opened state and detection information of the opened state is taken in (step S20), rotation detection information from the rotation sensors 42 and 44 is obtained (steps S14 and S21).

When detection information of the leftward rotation of the movable case unit 6 from the rotation sensors 42 and 44 is taken in (step S21), the display unit 18 changes into the state 4 to execute the left horizontal main display mode, which results in display of, for example, the left horizontal main display screen identical with the right horizontal main display screen 138 on the display unit 18 (step S22).

During execution of the left horizontal main display mode, when information indicating zero rotation angle is taken in as detection information from the rotation sensors 42 and 44 (step S23), the display unit 18 changes into the state 2 to execute the vertical main display mode, which results in display of, for example, the vertical main display screen 124 (FIG. 16) on the display unit 18 (step S24).

In the above procedure, at step S13, the rotation of the movable case unit 6 is monitored (step S21). When detection information indicating the leftward rotation of the movable case unit 6 is obtained from the rotation sensors 42 and 44, the procedure flow proceeds to step S22. At step S15, the rotation of the movable case unit 6 is monitored (step S23). When the rotation sensors 42 and 44 detect the state of rotation of zero degree, the procedure flow proceeds to step S24. At step S20, the rotation of the movable case unit 6 is monitored (step S14). When detection information indicating the rightward rotation is obtained from the rotation sensors 42 and 44, the procedure flow proceeds to step S15. At step S22, opening and closing of the movable case unit 6 is monitored (step S16). When detection information indicating the closed state is obtained from the opening/closing sensor 112, the procedure flow proceeds to step S17.

The advantages and effects of the first embodiment described above will be detailed while enumerating the features of the embodiment.

The portable terminal apparatus 2 includes the fixed case unit 4 serving as the fixed unit, the movable case unit 6 serving as the display unit, and the movable arm 8 that is fitted openably/closably to the fixed case unit 4 via the hinge 10. The movable case unit 6 is arranged to be rotatable around the rotation center Oa set at a position near the hinge 10 so that the movable case unit 6 can be rotated relative to the fixed case unit 4 to form an L shape.

According to the above configuration, when the portable terminal apparatus 2 is in the closed state, the movable case unit 6 and the movable arm 8 are folded onto the fixed case unit 4, in which state the movable case unit 6 can be rotated. When the portable terminal apparatus 2 is in the opened state, the movable case unit 6 is superposed on the movable arm 8, in which state the movable case unit 6 can be rotated. When the movable case unit 6 is provided with, for example, the display unit 18, therefore, the movable case unit 6 can be displaced to cause the display unit 18 to put out a display screen not only in the opened state but also in the closed state. This allows simplification and reduction in size of the apparatus 2, leading to an improvement not only in functional performance but also in product value including design property.

When a user holds the fixed case unit 4 in the left hand and rotates the movable case unit 6 rightward, the display screen of the display unit 18 of the movable case unit 6 approaches the fixed case unit 4, and the user can brings the display unit 18 on the movable case unit 6, which forms the L shape, to the user's face. This offers an effect of an improvement in visibility and of facilitating input operation on the input operation unit 16.

The movable case unit 6 having the display unit 18 is capable of rotating in both directions to the left and right. Because of this, detecting the direction of rotation to the left or to the right allows setting of a function according to each left or right display mode, enabling use of a different function for a different mode.

The movable case unit 6 having the display unit 18 has the rotation center Oa set near the hinge 10. Because of this, when the movable case unit 6 is closed on the fixed case unit 4, the movable case unit 6 is rotated to put half of the display area of the display unit 18 into use as a display screen, which allows a user to visually recognize a sub-display screen of the display unit 18 sticking out of the fixed case unit 4. In other words, merely rotating the movable case unit 6 while keeping it closed causes the display unit 18 to put out the sub-display screen without opening the movable case unit 6. The user can easily see the sub-display screen to check its contents.

The rotation center Oa of the movable case unit 6 having the display unit 18 is set near the hinge 10. This allows a reduction in the size of the portable terminal apparatus 2 to make it compact, and improves operability in operating keys on the input operation unit 16 on the fixed case unit 4. Setting the rotation center Oa near the hinge 10 allows moving a screen closer to the input operation unit 16, which leads to an improvement in the visibility of the display unit 18 and in key input operability as well.

The rotation center Oa of the movable case unit 6 is set at the position different from but near the position of the rotation center Ob of the hinge 10, and yet the movable case unit 6 and the hinge 10 are capable of rotating in directions different from each other (perpendicular to each other). This prevents the rotation of the movable case unit 6 and of the hinge 10 from interfering with each other, thus improves the rotation operability and opening/closing operability of the movable case unit 6 to make the rotation and opening and closing of the movable case unit 6 extremely easy.

Second Embodiment

Figure 27:
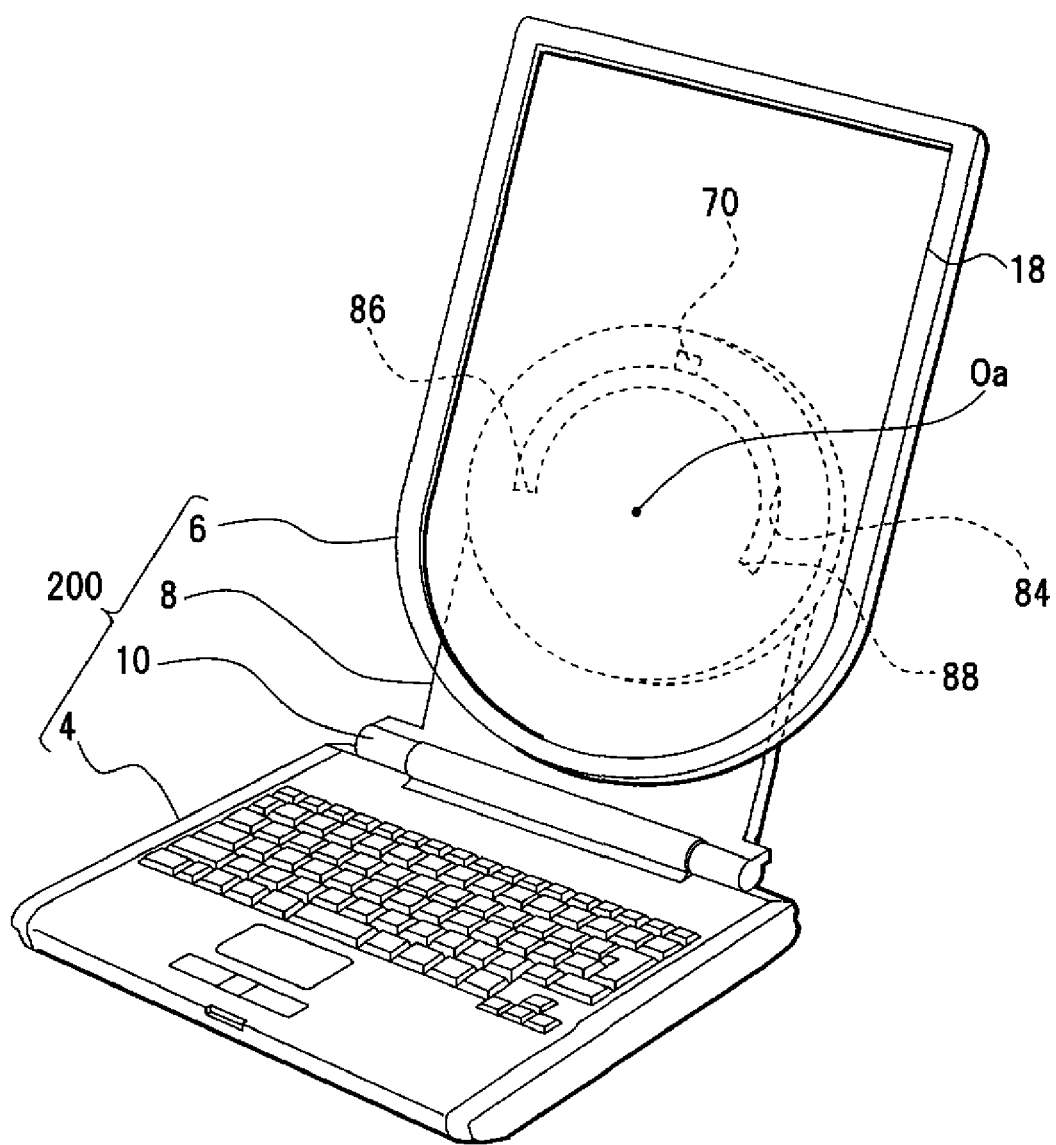
FIG. 27 depicts a PC (in vertical display) according to a second embodiment.
Figure 28:
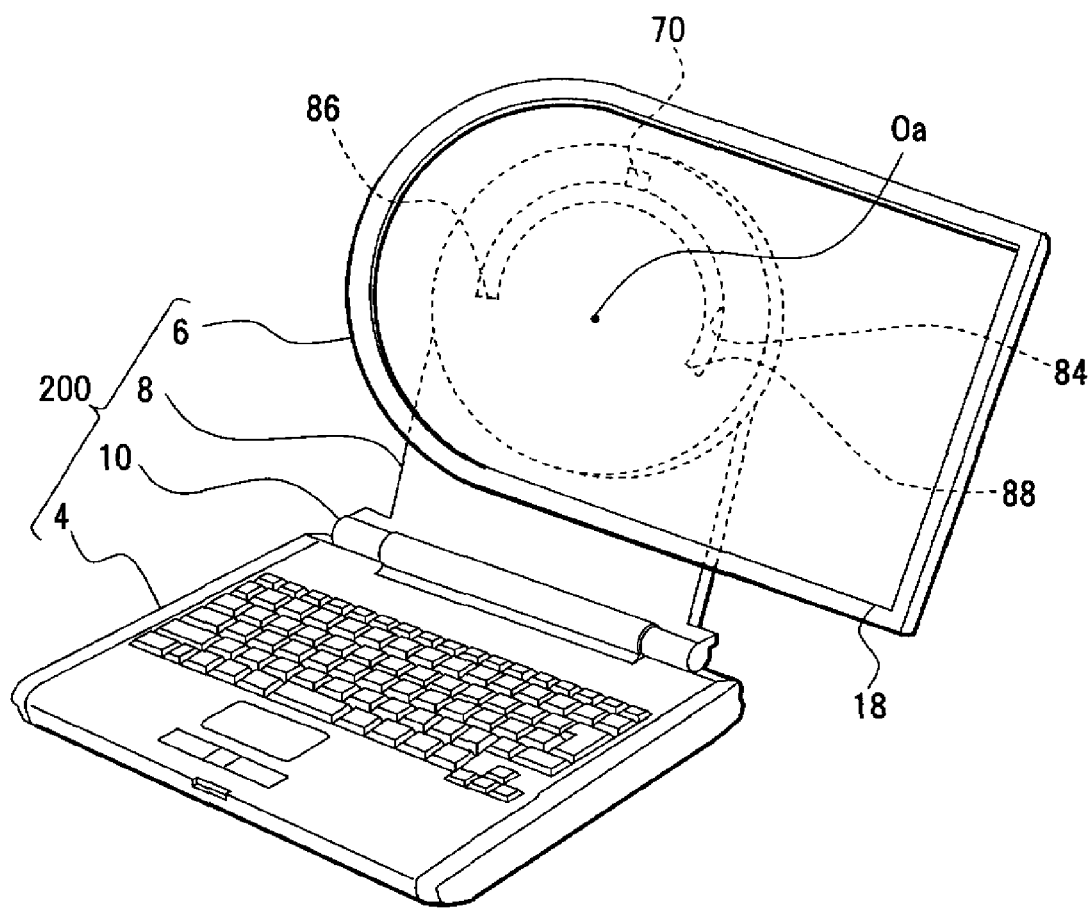
FIG. 28 depicts the PC (in horizontal display) according to the second embodiment.

A second embodiment of the present invention will now be described with reference to FIGS. 27 and 28. FIGS. 27 and 28 are perspective views of a personal computer (PC) according to the second embodiment. FIG. 27 depicts a case where the movable case unit 6 in the opened state is kept in a vertically elongated position, and FIG. 28 depicts a case where the movable case unit 6 in the opened state is rotated rightward and is kept in a horizontally elongated position. In FIGS. 27 and 28, the same components as described in FIGS. 1 to 25 are denoted by the same reference numerals.

In the first embodiment, the portable terminal apparatus 2 is described as an instance of an electronic apparatus. The PC 200 of the second embodiment also includes the above mechanism (FIGS. 1 to 6 and 8 to 14) and electric circuit (FIG. 15), and executes the above display control method (FIG. 7) and display control program (FIGS. 25 and 26), thus capable of displaying screens in the same display forms as described in the first embodiment (FIGS. 16 to 24). The PC 200 of the second embodiment, therefore, offers the same effect as offered by the first embodiment.

Other Embodiments

In the above embodiments, the portable terminal apparatus 2 and the PC 200 are described as an instance of an electronic apparatus. The present invention, however, can also apply to a remote controller, game machine, etc., equipped with a movable unit.

While the preferred embodiments of the present invention have been described heretofore, the description is not intended to limit the invention. Various modifications and alterations of the embodiments will be apparent to those skilled in the art according to the substance of the invention that is described in claims or disclosed in the specification, and such modifications and alterations will surely fall within the true scope of the invention.

The present invention relates to an electronic apparatus having a fixed case unit and a movable case unit. According to the electronic apparatus, the rotation center of the movable case unit is set near a hinge of the fixed case unit, which allows the movable case unit to be brought closer to the fixed case unit according to the rotation angle of the movable case unit. Because of this, providing the fixed case unit with an input operation unit and the movable case unit with a display unit improves the visibility of the display unit and the operability of the input operation unit, and contributes to simplification and reduction in size of the electronic apparatus. The present invention thus offers useful advantages.

What is claimed is:
1. An electronic apparatus having a fixed case unit and a movable case unit, comprising:
    a movable arm fitted openably and closably to the fixed case unit via a hinge, wherein
    the movable case unit is supported rotatably on the movable arm, with a rotation center of the movable case unit being positioned near the hinge,
    the movable case unit has a display unit, and
    at least a part of the display unit is exposed out of the fixed case unit by rotating the movable case unit while the movable arm and the fixed case unit are closed together.
2. The electronic apparatus of claim 1, wherein
    the movable case unit has an edge that rotates close to the hinge.
3. The electronic apparatus of claim 1, wherein
    the rotation center of the movable case unit is positioned on or near a centerline of the movable case unit.
4. The electronic apparatus of claim 1, wherein
    the movable case unit is capable of rotating in both directions to the left and right of the centerline of the movable case unit.
5. The electronic apparatus of claim 1, wherein
    a distance between the rotation center of the movable case unit and a rotation center of the hinge is smaller than a width of the movable case unit and is larger than a half of the width.
6. The electronic apparatus of claim 1, wherein
    the movable case unit has the display unit on a face facing the fixed case unit.
7. An electronic apparatus having a fixed case unit and a movable case unit, comprising:
    a movable arm fitted openably and closably to the fixed case unit via a hinge, wherein
    the movable case unit is supported rotatably on the movable arm, with a rotation center of the movable case unit being positioned near the hinge, and
    in case where the movable case unit is rotated while the movable arm and the fixed case unit are closed together, the movable case unit shifts relative to the fixed case unit to allow visual recognition of a part or the whole of a display area of a display unit on the movable case unit.
8. The electronic apparatus of claim 1, wherein
    the fixed case unit has an input operation unit on a face facing the movable case unit.
9. The electronic apparatus of claim 1, further comprising:
    a display unit disposed on the movable case unit;
    a rotation sensor detecting a rotation angle of the movable case unit; and
    a controlling unit changing a display form of a display screen on the display unit, the display form being changed on the basis of an angle detected by the rotation sensor.
10. The electronic apparatus of claim 9, further comprising:
    an opening/closing sensor detecting opening and closing of the movable arm, wherein
    the controlling unit causes the display unit to display a display screen on the basis of rotation detected by the rotation sensor in case where the movable case unit is closed, the display screen being displayed in a display form different from a display form that is displayed in case where the movable case unit is opened.
11. The electronic apparatus of claim 9, wherein
    the rotation sensor includes:
    a rotation sensor detecting leftward rotation of the movable case unit; and
    a rotation sensor detecting rightward rotation of the movable case unit.
12. The electronic apparatus of claim 10, wherein
    the rotation sensor includes:
    a rotation sensor detecting leftward rotation of the movable case unit; and
    a rotation sensor detecting rightward rotation of the movable case unit.

* * * * *